United States Patent
Kawakami et al.

(10) Patent No.: US 8,639,899 B2
(45) Date of Patent: Jan. 28, 2014

(54) STORAGE APPARATUS AND CONTROL METHOD FOR REDUNDANT DATA MANAGEMENT WITHIN TIERS

(75) Inventors: Norihiko Kawakami, Sagamihara (JP); Hiroshi Hirayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 424 days.

(21) Appl. No.: 13/129,221

(22) PCT Filed: Apr. 26, 2011

(86) PCT No.: PCT/JP2011/002442
§ 371 (c)(1),
(2), (4) Date: May 13, 2011

(87) PCT Pub. No.: WO2012/147123
PCT Pub. Date: Nov. 1, 2012

(65) Prior Publication Data
US 2012/0278569 A1    Nov. 1, 2012

(51) Int. Cl.
*G06F 12/00*    (2006.01)
*G06F 12/16*    (2006.01)

(52) U.S. Cl.
USPC ............................ 711/162; 711/114; 711/165

(58) Field of Classification Search
USPC .......................................... 711/114, 162, 165
See application file for complete search history.

(56) References Cited

U.S. PATENT DOCUMENTS

| | | |
|---|---|---|
| 6,928,526 B1 | 8/2005 | Zhu et al. |
| 7,631,155 B1 | 12/2009 | Bono et al. |
| 7,822,939 B1 | 10/2010 | Veprinsky et al. |
| 2006/0288176 A1 * | 12/2006 | Morishita et al. ............. 711/161 |
| 2007/0208788 A1 | 9/2007 | Chakravarty |
| 2009/0070541 A1 | 3/2009 | Yochai |

FOREIGN PATENT DOCUMENTS

WO    2005/017737 A2    2/2005
WO    2011/036020 A1    3/2011

* cited by examiner

*Primary Examiner* — John Lane
(74) *Attorney, Agent, or Firm* — Volpe and Koenig, P.C.

(57) ABSTRACT

A storage apparatus providing a logical storage area for storing data to an external apparatus, includes a plurality of storage devices each providing a physical storage area for storing the data, the storage devices being different from each other in device property including data input/output performance, a capacity virtualization part managing the physical storage areas of the storage devices as unit physical storage areas each having a predetermined storage capacity and managing the unit physical storage areas in association with a plurality of unit logical storage areas forming the logical storage area, a tier controller managing the plurality of unit physical storage areas by classifying into a plurality of tiers the unit physical storage areas provided by the storage devices having the different device properties, and a redundant data management part managing redundant unit storage areas which are a plurality of the unit physical storage areas storing the same data. The data migration between the tiers is controlled according to, for example, an access frequency to the data from the external apparatus.

15 Claims, 26 Drawing Sheets

Fig. 4

| LOGICAL SEGMENT | VIRTUAL VOLUME | PHYSICAL SEGMENT | ACCESS FREQUENCY |
|---|---|---|---|
| A | 0 | 1 | 20 |
| B | 1 | 1 | 30 |
| C | 2 | 1 | 50 |
| D | 0 | 4 | 40 |
| ... | ... | ... | ... |

LOGICAL SEGMENT MANAGEMENT TABLE 400

Fig. 5

| PHYSICAL SEGMENT | HASH VALUE | TIER LEVEL | ACCESS FREQUENCY | RG |
|---|---|---|---|---|
| 1 | abcd | 2 | 20 | 3 |
| 2 | abcd | 2 | 30 | 3 |
| 3 | abcd | 2 | 50 | 3 |
| 4 | efgh | 2 | 40 | 3 |
| 5 | efgh | 0 | 100 | 1 |
| ... | ... | ... | ... | |

PHYSICAL SEGMENT MANAGEMENT TABLE 500

Fig. 6

| TIER MIGRATION THRESHOLD | ACCESS FREQUENCY |
|---|---|
| TIER LEVEL0-1 | 200 |
| TIER LEVEL1-2 | 50 |

THRESHOLD MANAGEMENT TABLE 600

Fig. 7

| POOL (710) | CONFIGURATION MEDIA (720) | TIER LEVEL (730) |
|---|---|---|
| 1 | SSD | 0 |
| 2 | SAS | 1 |
| 3 | SATA | 2 |
| ... | ... | ... |

TIER MANAGEMENT TABLE 700

Fig. 8

| PHYSICAL SEGMENT (810) | HASH VALUE (820) | REDUNDANT PHYSICAL SEGMENT (830) |
|---|---|---|
| 1 | abcd | 2 |
|  |  | 3 |
|  |  | xxx |
| 4 | efgh | 5 |
| ... | ... | ... |

REDUNDANT SEGMENT MANAGEMENT TABLE 800

Fig. 15A

| TIER CONTROL INDEX | COST-ORIENTED |
|---|---|
| ~1501 | ~1502 |

TIER CONTROL INDEX MANAGEMENT TABLE 1500

Fig. 15B

| INDEX TYPE | TARGET TIER | ACCESS FREQUENCY THRESHOLD |
|---|---|---|
| INTER-TIER | TIER LEVEL0-1 | 200 |
|  | TIER LEVEL1-2 | 50 |
| INTRA-TIER | TIER LEVEL1 | 150 |
|  | TIER LEVEL2 | 30 |

ACCESS FREQUENCY INDEX TABLE 1510

Fig. 15C

| TIER | PERFORMANCE REQUIREMENT TYPE | ACCESS FREQUENCY THRESHOLD |
|---|---|---|
| TIER LEVEL1 | RESPONSE PERFORMANCE-ORIENTED | 200 |
| TIER LEVEL2 | THROUGHPUT PERFORMANCE-ORIENTED | 50 |

PERFORMANCE POLICY INDEX TABLE 1530

Fig. 15D

| TIER | USAGE RATIO THRESHOLD |
|---|---|
| TIER LEVEL0 | 60% |
| TIER LEVEL1 | 80% |

CAPACITY USAGE RATIO INDEX TABLE 1540

STORAGE APPARATUS AND CONTROL METHOD FOR REDUNDANT DATA MANAGEMENT WITHIN TIERS

TECHNICAL FIELD

The present invention relates to a storage apparatus and a method of controlling the storage apparatus.

BACKGROUND ART

Storage apparatuses are for providing data storage areas to software such as applications operating in an external apparatus such as a host computer. In general, multiple storage devices are managed in RAID (Redundant Array of Inexpensive Disks) system in order to add redundancy to stored data. For example, the storage apparatus as hardware has multiple hard disk drives disposed in array (Hard Disk Drive, hereinafter referred to as "HDD") and a disk controller for controlling the operation of HDD.

In general, the storage apparatus needs to be manufactured in such a manner that: a storage capacity expected to be needed in the future is set in advance at the designing stage; and storage devices such as HDDs which may not be actually used at the beginning of the operation are incorporated in advance and have to be allocated as storage areas to logical volumes to be used by an external apparatus. This produces a problem of increasing the cost burden on a storage user. As a solution to this problem, a technique referred to as a thin provisioning has begun to be introduced to the storage apparatus.

The thin provisioning technique provides a storage area called a pool area in a storage apparatus, and allows multiple host computers to share multiple virtual volumes through the pool area. A virtual volume is a logical volume provided to a host computer. The virtual volume is different from a general logical volume in that the general logical volume is associated with a logical storage area provided by a storage device, whereas the virtual volume is associated with a logical storage area in the pool area. When the host computer actually writes data to the virtual volume, a logical storage area with a storage capacity needed for wiring data is dynamically allocated to the host computer. The pool area is an aggregate of the logical storage areas including one or more RAID groups. The allocation units of storage capacities to be allocated to the host computers are not necessarily in a predetermined size, but may be changed based on the specifications of the storage apparatuses or the user settings for the operations of the storage apparatuses. In the following description, the unit storage area to be allocated to an external apparatus such as a host computer in the virtual volume is referred to as a "segment."

A storage apparatus with a virtualized storage area provides a host computer with a virtual volume which is a virtualized logical volume, and the virtual volume further includes virtualized logical segments. Each logical segment is associated with a physical segment provided by any of the storage devices mounted in the storage apparatus. In such a virtualized storage apparatus, the host computer accesses, via the virtual segment, the physical segment associated with the virtual segment by accessing the virtual segment associated with the logical segment in the pool area. This mechanism can bring an advantage of eliminating the necessity to mount an excessive storage device on the storage apparatus in advance, through the excessive storage device should be otherwise provided in consideration of future expected usage. The following patent literatures disclose an existing technique relating to the storage virtualization.

PTL 1 discloses the technique intended to improve cost effectiveness of a storage apparatus by using the thin provisioning technique with application of a management concept of tiers formed of multiple different storage devices. In this technique, the storage apparatus is generally configured to include a storage device including a high-speed and expensive storage device such as a semiconductor storage device (Solid State Drive, hereinafter referred to as "SSD"), a storage device including a middle-speed and middle expensive storage device such as SAS (Serial Attached SCSI) HDD, and a storage device having a low-speed, large capacity, and inexpensive storage device such as SATA (Serial Advanced Technology Attachment) HDD in combination. Pool areas in tiers are formed of all the storage devices and data is stored in a proper tier according to the access status or required performance. The tier management of data is performed in segment units of the thin provisioning technique or in any other units such as storage area units in specific size. For the access status to the storage area, access frequency information is generally managed in segment units.

PTL 2 discloses data deduplication technique in a storage apparatus. This technique improves the capacity efficiency of the storage apparatus by: detecting same data from data stored in the storage apparatus by using a technique such as a hash value comparison; when data blocks storing the same data are discovered, while leaving a specific one of the data blocks while releasing the other redundant data block; and then, changing the link destination of the virtual storage area linked with the redundant data block on the virtual volume so that the left specific data block will be referred to. Alternatively, upon receipt of a data write instruction from a host computer or the like, it is determined whether or not there is a redundant data block storing the same data among data already stored in the storage apparatus. The data redundancy determination is performed in units of data blocks having a certain size, that is, in units of segments. The segment size is, for example, a dynamic capacity allocation size, a fixed size, or variable length size in the thin provisioning technique. The data redundancy determination may be performed in file units.

Moreover, as the redundant data management technique for improving the capacity efficiency of the storage apparatus, there are techniques like a snapshot technique in addition to the deduplication technique, in which a copy of a virtual volume is created and a logical segment of the copy of the virtual volume is set to refer to the physical segment to which the copy source virtual volume also refers. With this configuration, the real physical data needs to be managed only for the copy source volume data and thus the capacity efficiency of the storage apparatus can be improved. Then, when a write command is generated anew by the host computer, a physical segment is reserved in another area and the reference destination of the logical segment on the virtual volume is changed to the newly-created physical segment.

CITATION LIST

Patent Literature

[PTL 1] U.S. Patent Application Publication No. 2009/0070541

[PTL 2] Specification of U.S. Pat. No. 6,928,526

SUMMARY OF INVENTION

Technical Problem

In PTL 1, the storage apparatus allocates or reallocates each segment managed by the tier control technique to a tier matching with a condition proper for the access frequency to the data stored in the segment.

Meanwhile, in order to improve the capacity efficiency of the storage apparatus, the redundant data management technique including the deduplication technique determines the segment storing redundant data and deletes the redundant segment. In this case, however, the segment left after the deduplication is referred to by all the logical segments associated with the segment. Thus, when I/O commands to the segments storing the same data are generated by a host computer or the like, all the accesses are concentrated to the left segment. Due to such access concentration, the access frequency information of the segment is changed so much after deduplication that the segment is not allocated any more in the tier matching with the proper condition.

The present invention is made with a view to solving the above-described and other problems. Accordingly, one of objectives of the invention is to provide a storage apparatus capable of providing both effects of improving capacity efficiency by deduplication and improving cost effectiveness by tier control.

Solution to Problem

To achieve the above object, an aspect of the present invention is a storage apparatus providing a logical storage area for storing data to an external apparatus, including: a plurality of storage devices each providing a physical storage area for storing the data, the storage devices being different from each other in device property including data input/output performance;
a capacity virtualization part managing the physical storage areas of the storage devices as unit physical storage areas each having a predetermined storage capacity and managing the unit physical storage areas in association with a plurality of unit logical storage areas forming the logical storage area;
a tier controller managing the plurality of unit physical storage areas by classifying into a plurality of tiers the unit physical storage areas provided by the storage devices having the different device properties; and
a redundant data management part managing redundant unit storage areas which are two or more/a plurality of the unit physical storage areas storing the same data, wherein
the tier controller classifies each of the unit physical storage areas into one of the tiers by use of a threshold of an access frequency from the external apparatus through the unit logical storage areas,
the tier controller calculates as the access frequency an access frequency to each of the unit physical storage areas belonging to the tiers based on an access record from the external apparatus, and classifies the unit physical storage areas into the tiers by comparing the calculated access frequencies with the access frequency threshold, and the redundant data management part determines, when the unit physical storage area is migrated from a migration source to a migration destination, wherein the migration source is the tier of source of the migration and the migration destination is the tier of destination of the migration, if the unit physical storage areas classified into the tiers by the tier controller include the redundant unit storage areas,
when determining that the tier of the migration destination includes the redundant storage areas, the redundant data management part changes a mapping of the unit logical storage area to the pre-migration unit physical storage area to the mapping to the post-migration unit physical storage area, and, when the migration destination and the migration source are the same tier, the redundant data management part changes the mapping of the unit logical storage area to the unit physical storage area that is any of the redundant unit storage areas to the mapping to another redundant unit storage area in the same tier.

Advantageous Effects of Invention

As described above, the storage apparatus according to an aspect of the present invention can provide effects of improving capacity efficiency by deduplication and improving cost effectiveness by tier control.

BRIEF DESCRIPTION OF DRAWINGS

FIG. 4 is a configuration diagram of a logical segment management table 400 according to an embodiment of the invention.

FIG. 5 is a configuration diagram of a physical segment management table 500 according to an embodiment of the invention.

FIG. 6 is a configuration diagram of a threshold management table 600 according to an embodiment of the invention.

FIG. 7 is a configuration diagram of a tier management table 700 according to an embodiment of the invention.

FIG. 8 is a configuration diagram of a redundant segment management table 800 according to an embodiment of the invention.

FIG. 15A is a configuration diagram of a tier control index management table 1500 according to an embodiment of the invention.

FIG. 15B is a configuration diagram of an access frequency index table 1510 according to an embodiment of the invention.

FIG. 15C is a configuration diagram of a performance policy index table 1530 according to an embodiment of the invention.

FIG. 15D is a configuration diagram of a capacity usage ratio index table 1540 according to an embodiment of the invention.

DESCRIPTION OF EMBODIMENTS

Hereinafter, embodiments of the present invention are described in accordance with the accompanying drawings.

First Embodiment

Figure 1:
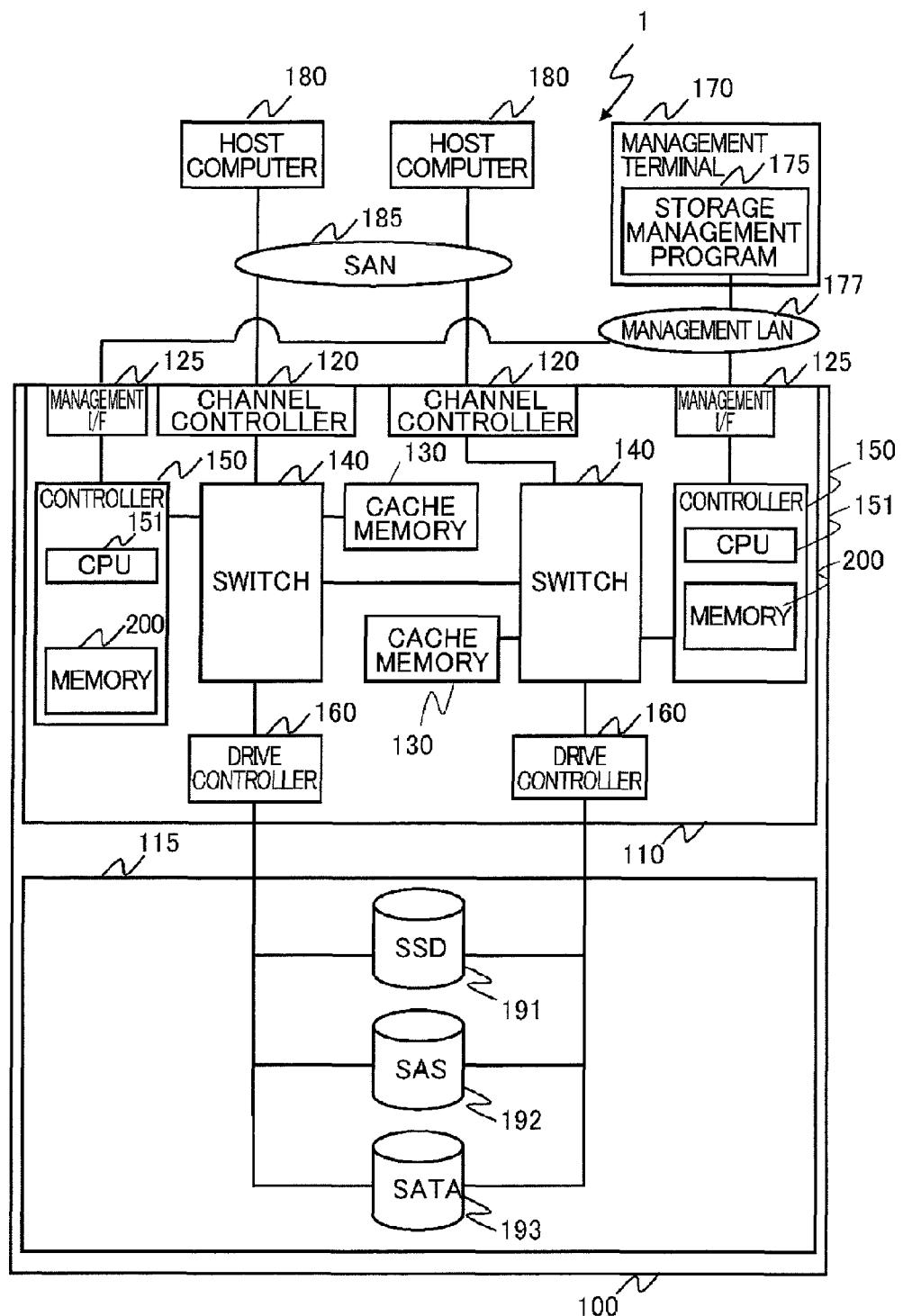
FIG. 1 is a configuration diagram of a storage system according to an embodiment of the invention.

First of all, a first embodiment of the invention is described. FIG. 1 is a configuration diagram of a storage system according to an embodiment of the invention. In this embodiment, when a storage apparatus is operated under a tier control environment, a physical segment is allocated in a tier with a proper condition based on a change in an access frequency with respect to the physical segment after deduplication processing is performed.

As shown in FIG. 1, the storage system 1 includes a storage apparatus 100, host computers 180, and a management terminal 170. The host computer 180 is coupled to the storage apparatus 100 through a first communication network 185 so as to be capable of communication. The management terminal 170 is coupled to the storage apparatus 100 through a second communication network 177. In this embodiment, the first communication network 185 and the second communication network 177 are a SAN (Storage Area Network) and a LAN (Local Area Network) respectively, but may be each configured by a communication line based on another communication protocol. Hereinafter, for convenience, the first communication network 185 is referred to as a SAN 185 and the second communication network 177 is referred to as a management LAN.

The host computer 180 is a computer which uses the storage apparatus 100 as a data storage area and issues an I/O request (read request or write request) to the storage apparatus 100 through the SAN 185. The host computer 180 has a general computer configuration which includes a processor such as a CPU (Central Processing Unit) and a MPU (Micro Processing Unit), a main storage device including a memory element such as a RAM (Random Access Memory) and a ROM (Read-Only Memory), a secondary storage such as HDD, an input device such as a keyboard, mouse, tablet, or voice input device, a display such as a liquid crystal display, an output device including a printer, speaker, or the like, and a communication interface performing communication processing with the SAN 185. The function as the host computer 180 is achieved in such a manner that a processor executes an operating system (OS) stored in the main storage device, a data I/O module, and programs including applications, and the like.

The management terminal 170 is a computer for managing various settings and operations of the storage apparatus 100. In the same way as in the host computer 180, the management terminal 170 according to this embodiment has a general computer configuration and achieves a function as the management terminal 170 in such a manner that a processor executes various programs stored in the main storage device. The programs stored in the main storage include a storage management program 175. The storage management program 175 is executed by the processor based on an input of various data from an input device, so that processing such as a setup is executed in the storage apparatus 100 through the management LAN 177.

Hereinafter, the storage apparatus 100 is described. As shown in FIG. 1, the storage apparatus 100 has a controller 110 and a storage device 115. The storage device 115 includes different types of multiple storage devices. For the storage device, a SSD, a flash memory device, an optical drive, or the like may be provided in addition to HDD. Furthermore, as for HDD, various types of HDDs may be used according to the type of interface, such as SAS or SATA, difference in storage capacity, rotational frequency performance, or cost, and the like.

The controller 110 has a function to control a data I/O 5 from the host computer 180 through the SAN 185 with respect to the storage device 11. Also, the controller 110 receives an operation command input from the management terminal 170 through the management LAN 177 and performs operation setup processing of each unit of the storage apparatus 100. As shown in FIG. 1, the controller 110 includes channel controllers 120, management interfaces 125 (hereinafter referred to as "management I/F"), controllers 150, switches 140, cache memories 130, and drive controllers 160. Each of the channel controller 120, the management I/F 124, the controller 150, the switch 140, and the drive controller 160 has a processor, a memory, a data input/output interface, and the processor executes programs to achieve functions of the units stored in the memory. The cache memory 130 includes a memory element such as a RAM and a data input/output interface. In this embodiment, two pairs of function modules including the channel controllers 120, the managements I/F 125, the controllers 150, the cache memories 130, the switches 140, and the drive controllers 160, are provided, which configure a redundant system providing a failover function and the like. In this embodiment, as these function modules include the same functions, these function modules are not particularly distinguished in the following description.

The channel controller 120 receives/transmits data or a data input/output request between the channel controller 120 and the host computer 180 through the SAN 185.

The management I/F 125 communicates with an external apparatus such as the management terminal 170 trough the management LAN 177 so as to receive/transmit management information and a management request from the management terminal 170 to the storage apparatus 100.

The cache memory 130 is a shared memory which stores data and the like to be used by the controller 150 and the like for performing control. The switch 140 performs mutual communication control among the channel controller 120, the management I/F 125, the controller 150, the cache memory 130, and the drive controller 160.

The controller 150 includes a CPU 151 as a processor and a memory 200. The CPU 151 controls data which is received/transmitted through the channel controller 120 and the management I/F 125 and a data input/output performed by the storage apparatus 100. The CPU 151 also reads various programs and tables which are stored in the memory 200 and executes the read programs.

The drive controller 160 is an interface circuit for the controller 110 to communicate with the storage device 115, and performs control of setups or operations over the storage device 115 according to the control of the controller 150.

The storage device 115 stores various pieces of information regarding data or the storage apparatus 100 according to the content of the data I/O request received from the drive controller 160. The storage device 115 of this embodiment includes two or more types of different storage devices. For example, storage drives such as SSD 191, SAS HDD 192, SATA HDD 193, and the like having different performances, capacities, or cost from each other, are mounted.

Figure 2:
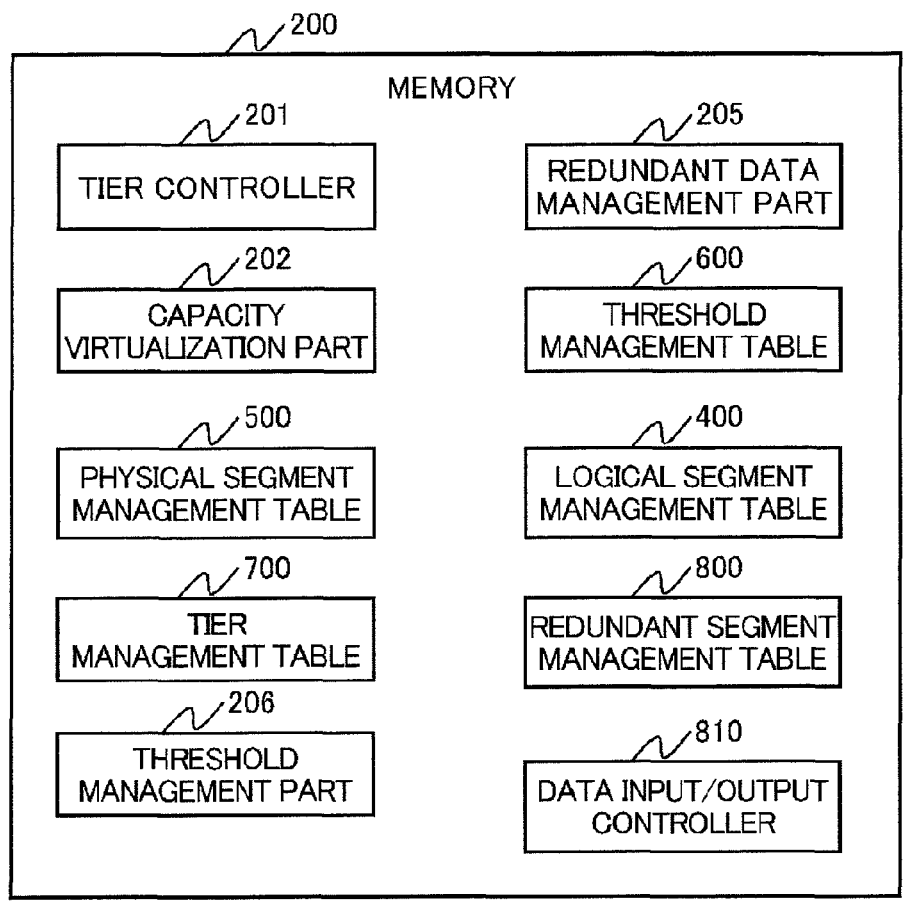
FIG. 2 is a functional configuration diagram of an inside of a memory of the storage apparatus according to an embodiment of the invention.

Hereinafter, the configuration of software to achieve a function of the controller 150 is described by referring to FIG. 2. FIG. 2 is a diagram showing the configuration of the memory 200 according to this embodiment.

The memory 200 stores information required for controlling the storage apparatus 100. Specifically, the memory 200 stores a tier controller 201, a capacity virtualization part 202, a physical segment management table 500, a tier management table 700, a threshold manager 206, a redundant data manager 205, a threshold management table 600, a logical segment management table 400, a redundant segment management table 800, and a data input/output controller 810. The memory 200 may be configured of a non-volatile memory.

The tier controller 201 has a function to control data migration processing, between the different types of storage devices, performed in the storage apparatus 100 according to this embodiment. The capacity virtualization part 202 has a function to create a virtualization volume to be provided to an external apparatus such as the host computer 180 from the storage device provided in the storage apparatus 100 according to this embodiment. The data input/output controller 810 has a function to execute general data processing performed inside the controller 110 and performs the entire function that the storage apparatus 100 normally includes. Each of the tier controller 201, the capacity virtualization part 202, and the data input/output controller 810 is a program which is executed by the CPU 151 of the controller 150. The functions of the tier controller 201 and the redundant data manager 205 are described later in accordance with flowcharts. In addition, the configuration examples of data tables stored in the memory 200 are described later.

Figure 3:
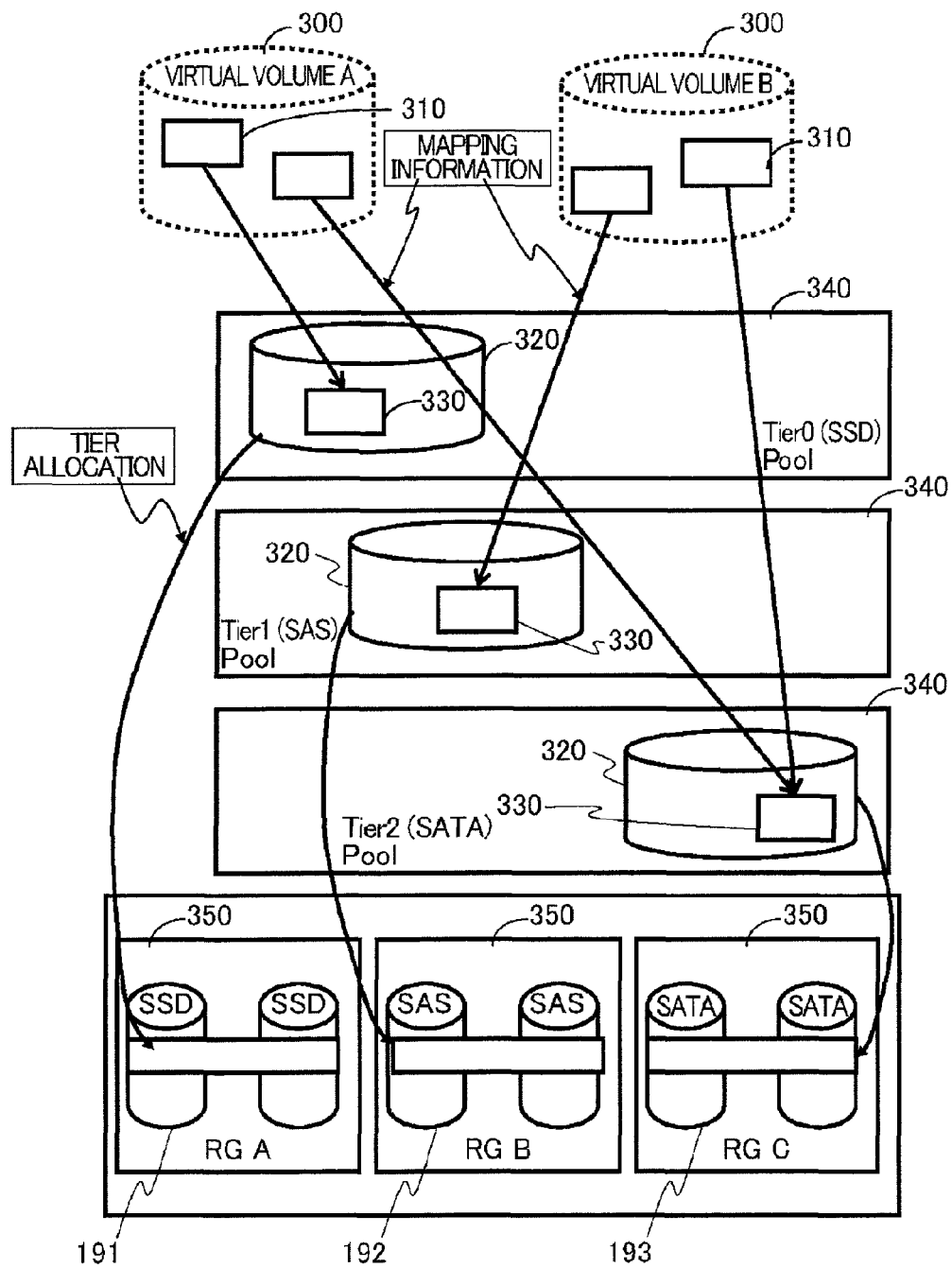
FIG. 3 is a diagram schematically illustrating the logical configuration and tier control of a group of storage devices according to an embodiment of the invention.

Hereinafter, the configuration of the storage area in the storage apparatus 100 according to this embodiment is described. FIG. 3 illustrates the logical tier structure of the storage area in the storage apparatus 100 according to this embodiment.

The storage device 115 of the storage apparatus 100 includes different types of storage devices, each of the types including multiple storage devices. In general, the multiple storage devices having the same type (SDS 191, SAS HDD 192, or SRA HDD 192 shown in FIG. 3) configure a RAID group 350. At least one real volume 320 is created from one RAID group 350. The storage area configured from one or more real volumes 320 is referred to as a pool 340. One pool 340 includes one or more RAID groups 350.

The pools 340 which provide storage areas and which have different types of storage devices from each other are managed as individual tiers. For example, the SSD 191 which is a fastest storage device is allocated to an uppermost tier (Tier 0 in FIG. 3), the SAS HDD 192 which is a second fastest storage device to the SSD 191 is allocated to a middle tier (Tier 1 in FIG. 3), and the SATA HDD 193 which is a slow and large capacity device is allocated to a lower tier (Tier 2 in FIG. 3).

Under a capacity virtualization environment of the storage apparatus 100, the host computer 180 is provided with a virtual volume 300 which is a virtual logical storage area to be a target to which the host computer 180 makes an access. In the virtual volume 300, a virtual storage capacity that the host computer 180 is caused to recognize is set. However, the storage area provided by the storage device is actually used at the timing when the host computer 180 actually generates a write request to the storage apparatus 100. At the time of generating the write request, a storage area is allocated to the virtual volume 300 for each segment which is a unit of a storage area allocated from the real volume 320 inside the pool 340. Accordingly, as shown in FIG. 3, the storage apparatus 100 of this embodiment manages each logical segment 310 (unit logical storage area) inside the virtual volume 300 and each physical segment 330 (unit physical storage area) inside the real volume 320 configuring the pool 340 so as to be corresponded to each other.

Based on an index such as the frequency that the physical segment 330 is accessed from the host computer 180 through the logical segment 310 inside the associated virtual volume 300 or the performance required for data input/output from the host computer 180, the physical segment 330 used with higher frequency is disposed in an upper tier. In contrast, the physical segment 330 is migrated sequentially to a lower tier as the frequency of using the physical segment 330 is lower. At this time, the logical segment 310 to which the host computer 180 makes a direct contact is seen unchanged at all by the host computer 180. In other words, the migration between the tiered pools 340 of the physical segment 330 is achieved by managing the change in the correspondence relationship between the logical segment 310 and the physical segment 330 inside the storage apparatus 100. For this reason, the host computer 180 can make a transparent access to the storage apparatus 100.

In the technique of managing redundant data, such as a deduplication technique, only one physical segment 330 storing the same data is left, and mapping information from the multiple logical segments storing the same data to the one physical segment 330 left is managed.

Hereinafter, a data table stored in the memory 200 of the controller 150 is described. First, the logical segment management table 400 is described. FIG. 4 is a configuration example of the logical segment management table 400. The logical segment management table 400 is used for managing the correspondence relationship between the logical segment 310 and the physical segment 330.

As shown in FIG. 4, the logical segment management table 400 according to this embodiment stores a logical segment 410, a virtual volume 420, a physical segment 430, and an access frequency 440 which are associated with one another.

The logical segment 410 stores an identifier for uniquely identifying the logical segment 310. The virtual volume 420 stores a number for uniquely identifying the virtual volume 300 to which the corresponding logical segment 410 belongs. The physical segment 430 stores an identifier for the corresponding physical segment 330 in which data of the corresponding logical segment 410 is actually stored. The access frequency 440 stores information regarding the frequency of accesses made by the host computer 180 to the corresponding logical segment 410. The access frequency 440 is managed in such a manner that the tier controller 201 monitors data input/output with respect to each logical segment 310. The access frequency information is a recorded number of times that the host computer 180 makes an access to the logical segment 410 over a period of time, such as one hour, a day, or a month.

Next, the physical segment management table 500 is described. FIG. 5 shows a configuration example of the physical segment management table 500 according to this embodiment.

The physical segment management table 500 stores a physical segment 510, a hash value 520, a tier level 530, an access frequency 540, and a RG 550 which are associated with one another.

The physical segment 510 stores therein an identifier for uniquely identifying the physical segment 330 inside the storage apparatus 100. The hash value 520 stores a hash value which is obtained by calculating stored data for determining whether or not the stored data matches with the corresponding physical segment 510. For example, the timing of the calculation of the hash value 520 can be set at the time of updating the data stored in the physical segment 510. However, taking a load of the controller 150 into consideration, the timing may be set at any proper point of time. The tier level 530 stores an identifier (for example, any of 0 to 2 shown in FIG. 3) for identifying a tier in which the corresponding physical segment 510 is allocated. The access frequency 540 stores information regarding the frequency of an access made by the host computer 180 or the like to the corresponding physical segment 510. The RG 550 stores an identifier of the RAID group 350 to which the corresponding physical segment 510 is allocated.

Hereinafter, the threshold management table 600 is described. FIG. 6 is a configuration example of the threshold management table 600 according to this embodiment.

The threshold management table 600 stores a tier migration threshold 610 and an access frequency 620 which are associated with one another.

The tier migration threshold 610 stores information for identifying a tier to which the physical segment 330 aims to migrate. The access frequency 620 stores an access frequency to the physical segment 330, the frequency being used as a reference value for determining if the physical segment 330 needs to be migrated between tiers.

As shown in FIG. 6, in this embodiment, the tier level 0-1 is stored in the tier migration threshold 610 and the numerical value "200" is stored in the corresponding access frequency 620. This shows the condition such that when the access frequency 620 of the physical segment 330 in the uppermost tier (Tier 0 including SSD 191) with the tier level 0 becomes smaller than "200," the physical segment 330 is migrated to the tier with tier level 1 which is a lower tier. In contrast, when the access frequency 620 of the physical segment 330 allocated in the tier level 1 exceeds "200," the physical segment 330 is migrated to the tier level 0. The tier migration threshold 610 between the tier level 1 and the tier level 2 is also used as a reference value for inter-tier migration of the physical segment 330.

Hereinafter, the tier management table 700 is described. FIG. 7 shows a configuration example of the threshold management table 700 according to this embodiment.

The tier management table 700 stores a pool 710, a configuration media 720, and a tier level 730 which are associated with one another.

The pool 710 stores therein an identifier for identifying a pool 340 inside the storage apparatus 100. The configuration media 720 stores therein information indicating types of a storage drive. The tier level 730 stores therein an identifier for identifying a tier.

As shown in FIG. 7, in this embodiment, the pool 1 includes SSD 191 which is a high-speed media and is set in tier level 0. The tier level 730 means that a smaller recorded numerical number is a higher layer tier. According to the levels of performances of the configuration media, the pools 340 including SAS HDD 192 and SATA HDD 193 respectively are set in tier level 1 and tier level 2 sequentially as a lower tier.

Hereinafter, the redundant segment management table 800 is described. FIG. 8 shows a configuration example of a redundant segment management table 800 according to this embodiment.

The redundant segment management table 800 stores therein a physical segment 810, a hash value 820, and a redundant physical segment 830 which are associated with one another.

The physical segment 810 stores therein an identifier for identifying the physical segment 330 shown in FIG. 3. The hash value 820 stores a hash value which is obtained by calculating data stored in the corresponding physical segment 330 for determining whether or not the stored data matches with the physical segment 810. It should be noted that an index to determine whether or not the data stored in each physical segment 330 duplicates the data stored in another physical segment 330 is not limited to a hash value used in this embodiment but the index is only needed to be information (for example, stored data itself) capable of being used for redundancy determination. The redundant physical segment 830 stores an identifier of another physical segment 330 storing redundant data which are the same as data stored in the physical segment 330 having the identifier associated with the physical segment 810. As shown in FIG. 8, there is a case where multiple redundant physical segments 830 are associated with one physical segment 810. The redundant physical segment 830 with the redundant data being undeleted is a physical segment 330 which is referred by the logical segment 310 different from the logical segment 310 associated with the corresponding physical segment 330.

Figure 9:
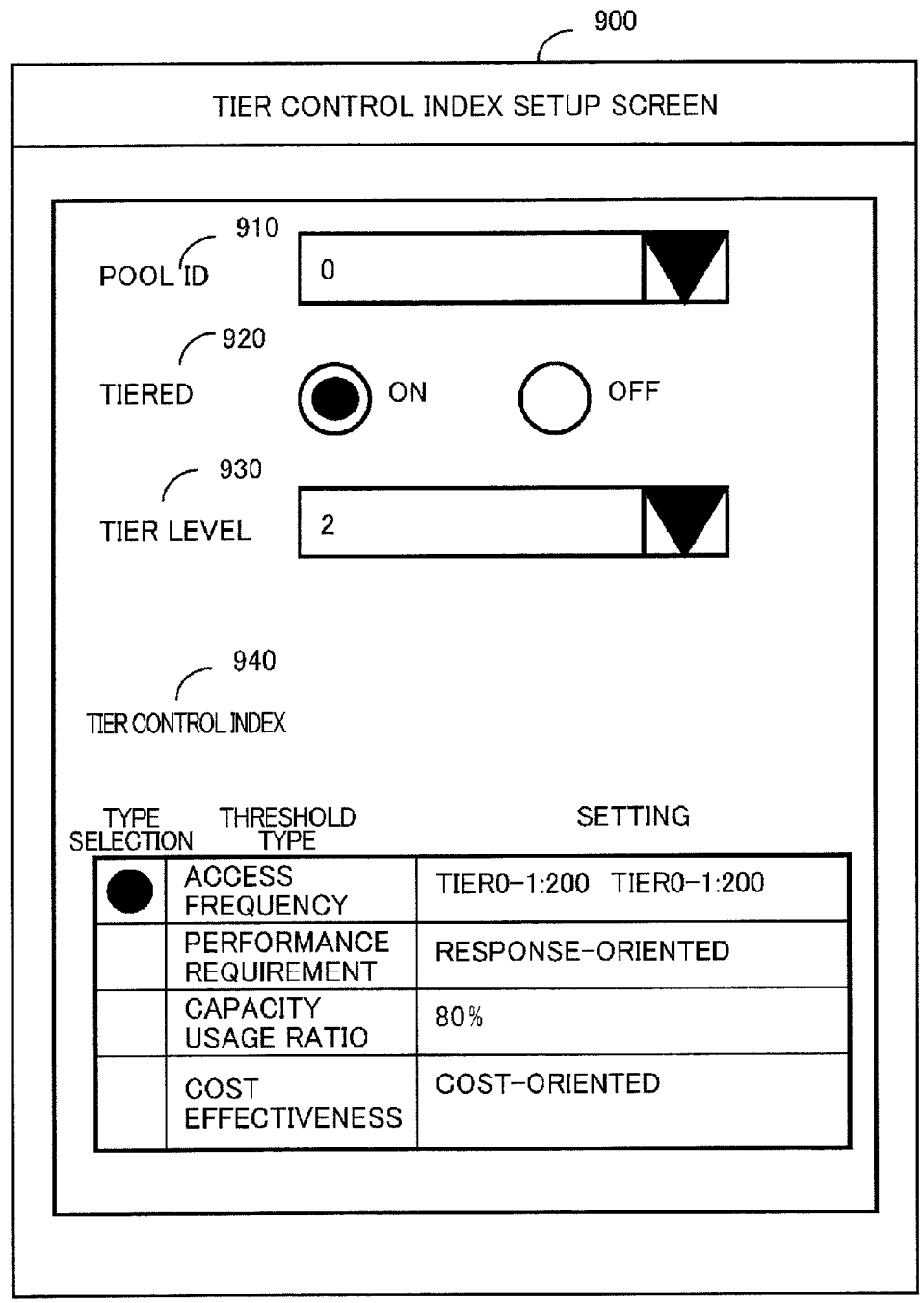
FIG. 9 is an example of a tier control index setup screen 900 according to an embodiment of the invention.

Hereinafter, a tier control index setup screen 900 used in the management terminal 170 is described. FIG. 9 shows an example of the tier control index setup screen 900 according to this embodiment.

The tier control index setup screen 900 is a graphical user interface screen which is displayed in an output device such as a display provided in the management terminal 170 in order that the storage management program 175 of the management terminal 170 performs setup on the storage apparatus 100 regarding tier control on redundant data.

The pool ID 910 is an object for selecting an identifier for identifying a target pool 340 for setting a tier control index and is shown in a pull-down menu in the example of FIG. 9. The tiered 920 is an object for managing whether or not the pool 340 is targeted for the tier management. When the pool 340 selected by the pool ID 910 is integrated into the tier management, "ON" of a radio button is selected. The tier level 930 is an object for selecting a tier level 730 in FIG. 7 into which the associated pool 340 is integrated when the pool 340 designated by the pool ID 910 is targeted for the tier management, and designates a target tier level 930 by the pull-down menu. The tier control index 940 is an object for setting up a redundant data control method in the storage apparatus 100, and is used to select each index from multiple control indexes by turning "ON" the radio button in the space in the example of FIG. 9. In the tier control index 940, applications to determine which index of one or more indexes is used for control, threshold types for selecting type of an index threshold and the setup content for each type are displayed in mapping with one another.

In this embodiment, as shown in FIG. 9, the pool 0 is integrated into the tier management under the items of Pool ID 910, Tiered 920, and Tier level 930. Then, in the item of the tier control index 940, an access frequency as a control index for redundant data is selected as a reference. In addition, the control index of the storage apparatus 100 is set in such a manner that a migration threshold of the physical segment 330 between the 0 tier and the first tier is set as an access frequency 200 and a migration threshold of the physical segment 330 between the first tier and the second tier is set as an access frequency 50. With regard to the item of the tier control index 940, another threshold type other than the illustrated one may be set in advance in the storage apparatus 100. Thus, it may be designed such that a user may add anew the desired tier control index 940 by using the storage management program 175 of the management terminal 170. With regard to the content of setup, a predetermined value may be set in advance in the storage apparatus 100. Alternatively, a user may set the content of setup by using the storage management program 175 of the management terminal 170.

Figure 10A:
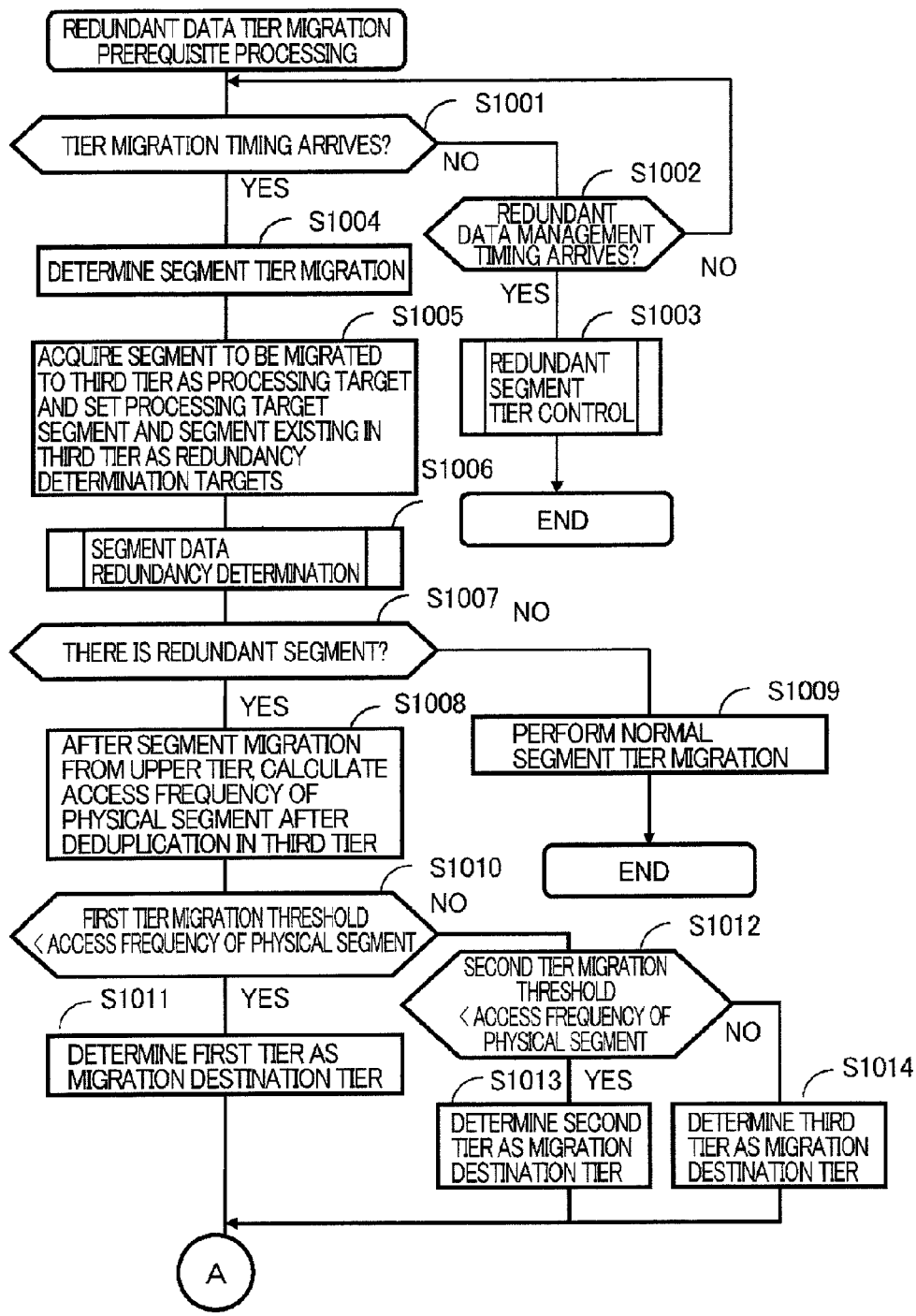
FIG. 10A is a flowchart illustrating a redundant data tier migration prerequisite processing according to an embodiment of the invention.
Figure 10B:
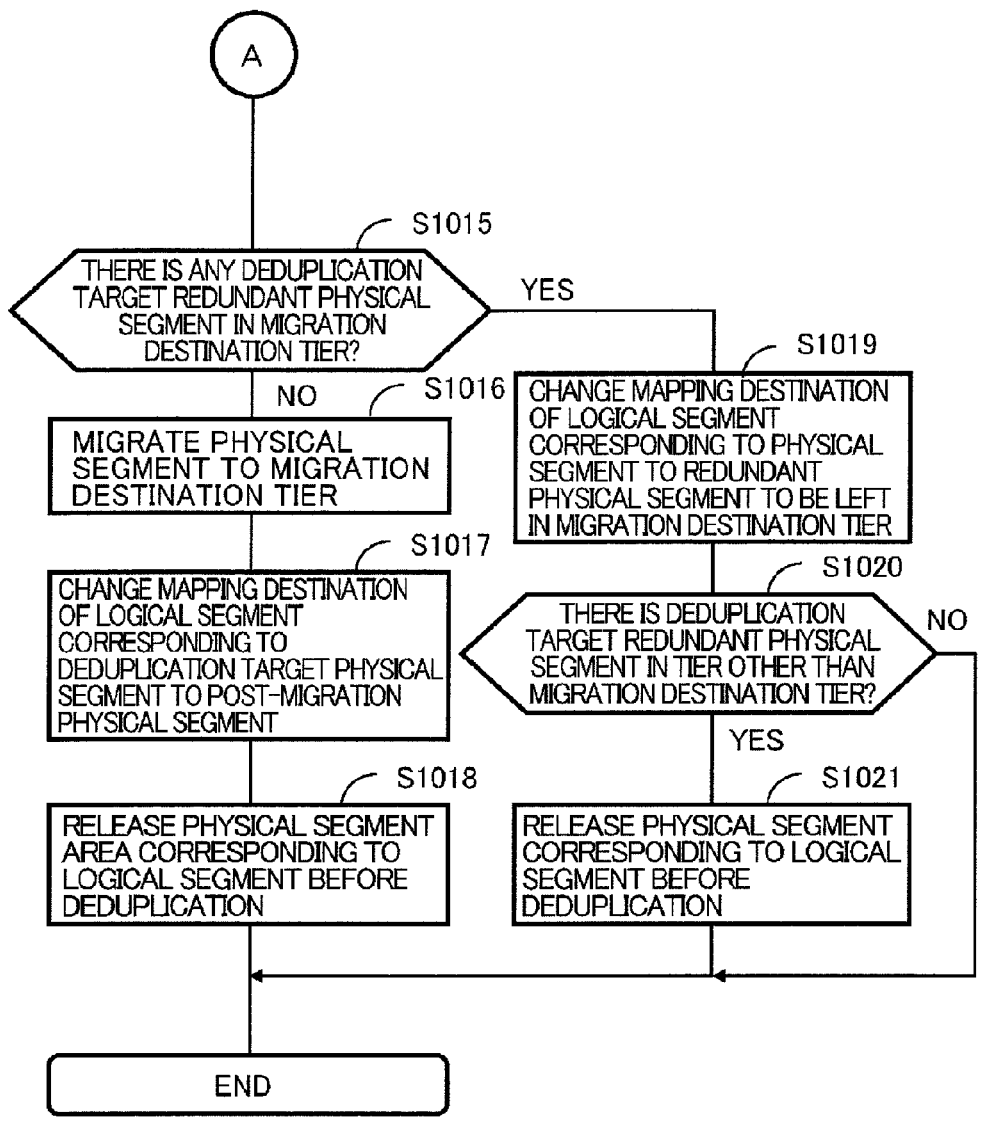
FIG. 10B is a flowchart illustrating a redundant data tier migration prerequisite processing according to an embodiment of the invention.

Subsequently, tier migration control processing according to this embodiment is described by referring to the accompanying drawings. Firstly, redundant data tier migration prerequisite processing is described. FIGS. 10A and 10B show an example of a flowchart of the redundant data tier control processing which is executed by the storage apparatus 100 according to this embodiment. It should be noted that a sign "S" included in a reference sign attached to each processing box signifies "Step."

This redundant data tier migration prerequisite processing is executed based on a set control index in such a manner that the CPU 151 of the controller 150 of the storage apparatus 100 executes a program corresponding to the tier controller 201 in the memory 200. The set control index means a predetermined time interval such as per day. In general, the predetermined time interval is longer than an interval at which access frequency information of a segment is recorded. In particular, the deduplication is performed on data in the lower tier at the time of performing data tier migration to the lower tier, so that the cost effectiveness and the capacity efficiency are improved. It should be noted that a functional unit corresponding to the program (for example, the tier controller 201) is described hereinafter as an agent for functions to be achieved by various programs in the memory 200.

However, the agent to execute the various functions is not particularly limited to the functional unit associated in this embodiment, and the storage apparatus 100 may employ another configuration.

Firstly, the tier controller 201 determines whether or not a tier migration determination condition is fulfilled (S1001). The tier migration determination condition is fulfilled in such a manner that when the processing is executed at predetermined intervals, such as per day, a time to execute the processing is set in advance in the memory 200, for example, to cause the tier control at that set time. When it is determined that the tier migration determination condition is fulfilled (S1001, Yes), the step proceeds to the steps of S1004 and the following steps. The tier controller 201 periodically checks the condition, and when it is determined that the tier migration determination condition is not fulfilled (S1001, No), the step proceeds to S1002.

It is determined at S1002 whether or not the condition for executing the deduplication processing is fulfilled. The deduplication processing includes entire redundant data management processing such as copy processing (snapshot processing) of the virtual volume (V-Vol) 300 for improving the capacity efficiency of a storage device in such a manner that unwanted redundant data is not to be stored. Specifically, the condition means, for example, the result of monitoring processing execution period over a certain period, receipt of a command sent by a user from the management terminal 170 or the like, and when a storage capacity of a given type of storage device in the storage apparatus 100 becomes smaller than a predetermined value. Alternatively, the processing may be performed when a data write request is received anew by the storage apparatus 100 from the host computer 180 or the like.

When it is determined that the deduplication condition is not fulfilled (S1002, No), the processing of the tier controller 201 returns to S1001. In contrast, when it is determined that the deduplication condition is fulfilled (S1002, Yes), the processing of the tier controller 201 proceeds to S1003. At step S1003, the tier controller 201 performs the redundant segment tier control of this embodiment before finishing the processing flow. The details of the redundant segment tier control processing are described later.

At step S1004, the tier controller 201 determines if the tier of the segment is migrated by an existing tier control technique described in patent literature 1, for example. In this embodiment, the access frequency 540 of each physical segment 510 is acquired from the table in FIG. 5, and then the acquired access frequency 540 is compared with the access frequency 620 corresponding to the tier migration threshold 610 in the table in FIG. 6. By doing this, the tier controller 201 determines if the tier level 530 associated with each physical segment 510 has to be updated. With regard to the physical segment 510 determined necessary to be migrated from the current tier, data showing information on that determination is stored in a temporary area of the memory 200, for example.

Subsequently, the tier controller 201 refers to FIG. 5 to acquire a list of segments targeted to be migrated to the third tier (tier level 2) by the tier control technique and set the list as a processing target. Then, the tier controller 201 sets the migration target segments and the segment existing in the third tier as deduplication determination target (S1005). The third tier means the tier level 2 in this embodiment, and generally includes a tier corresponding to a storage area positioned in the lowermost layer in terms of performances of a storage device and a tier corresponding to the storage area which is cost-oriented and which comparatively need not have a high performance.

Thereafter, the tier controller 201 performs segment data redundancy determination processing (S1006). The segment data redundancy determination processing is described later in detail.

After that, the tier controller 201 determines whether or not the segment having redundant data is present as a result of determining at S1006 if there is redundant data in the segment (S1007). When determining that there is the segment having the redundant data (S1007, Yes), tier controller 201 moves the processing to S1008. In contrast, when determining that there is no segment having the redundant data (S1007, No), the tier controller 201 moves the processing to S1009 and performs the general tier control processing on the segment, the processing the same as that of S1004 before completing the processing.

Then, after the segment migration determination processing performed at S1004 from the upper tier to the lower tier, the tier controller 201 acquires the access frequency for every physical segment 330, which is stored in the third tier after the deduplication processing is performed in the third tier (S1008).

The tier controller 201 determines whether or not the access frequency of each physical segment 330 acquired at S1008 exceeds the migration threshold to the first tier (S1010).

When determining that the access frequency of the physical segment 330 exceeds the migration threshold to the first tier (S1010, Yes), the tier controller 201 designates the first tier as the migration destination tier of the physical segment 330 (S1011).

In contrast, when determining that the access frequency of the physical segment 330 does not exceed the migration threshold to the first tier (S1010, No), the tier controller 201 determines whether or not the access frequency of the physical segment 330 exceeds the migration threshold to the second tier (S1012).

When determining that the access frequency of the physical segment 330 exceeds the migration threshold to the second tier (S1012, Yes), the tier controller 201 designates the second tier as the migration destination tier of the physical segment 330 (S1013).

When determining that the access frequency of the physical segment 330 does not exceed the migration threshold to the second tier (S1012, No), the tier controller 201 designates the third tier as the migration destination tier of the physical segment 330 (S1014).

After that, the tier controller 201 determines whether or not any one of the redundant physical segments 330 determined at S1008 as the deduplication targets is present in the tier designated as a migration destination (S1015). When determining that no redundant physical segment 330 is present in the tier determined as the migration destination (S1015, No), the tier controller 201 migrates the physical segment 330 which is deduplicated to the tier determined as the migration determination (S1016). Next, the tier controller 201 changes the mapping destination of the logical segment 310 corresponding to a deduplication target physical segment 330 to the post-migration physical segment 330 (S1017). Then, the tier controller 201 releases the area of the physical segment 330 which was the mapping destination of the logical segment 310 before the deduplication and completes the processing (S1018).

In contrast, when determining that some redundant physical segment 330 is present in the tier determined as the migration destination (S1015, Yes), the tier controller 201 changes the mapping destination of the logical segment 310 corresponding to the deduplication target physical segment 330 to the remaining physical segment 330 present in the migration destination (S1019). Then, the tier controller 201 determines whether or not a deduplication target redundant physical segment 330 is present in a tier other than the migration destination tier (S1020). When determining that the deduplication target redundant physical segment 330 is present in a tier other than the migration destination tier (S1020, Yes), the tier controller 201 releases the area of the physical segment 330 corresponding to the logical segment 310 before deduplication (S1021).

When determining that the deduplication target redundant physical segment 330 is absent in a tier other than the migration destination tier (S1020, No), the tier controller 201 finishes the processing.

With the above-described redundant data tier migration prerequisite processing, the tier migration processing for the physical segment 330 firstly considering the presence or absence of the redundant physical segment in each tier is completed.

Figure 11:
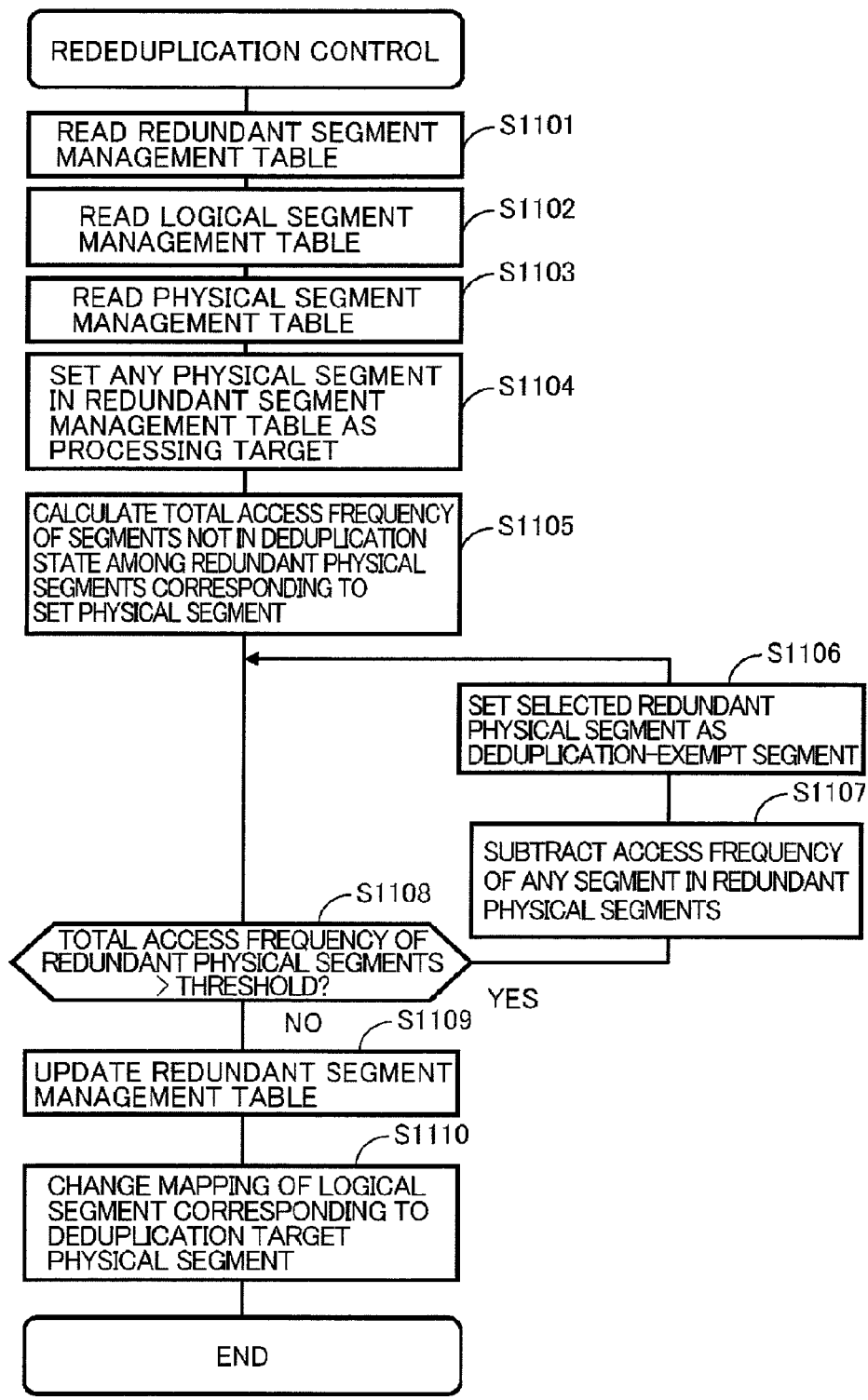
FIG. 11 is a flowchart illustrating rededuplication control processing according to an embodiment of the invention.

Hereinafter, the re-deduplication control processing according to this embodiment is described. FIG. 11 is a flowchart illustrating an example of the re-deduplication processing. The processing flow is executed at the timing when the deduplication processing of FIG. 10 is executed by the function of the redundant data management part 205 which is executed by the CPU 151 of the controller 150. The execution timing for the deduplication processing includes the timing when a user instruction is received from the management terminal 170, when a certain period of time, such as per day, has elapsed, or when the capacity usage ratio of some pool 340 exceeds a certain threshold.

Firstly, the redundant data management part 205 reads from the memory 200 the redundant segment management table 800, the logical segment management table 400, and the physical segment management table 500 (S1101 to S1103). After that, the redundant data management part 205 designates any physical segment 330 in the redundant segment management table 800 as a processing target (S1104), then all the redundant physical segments 330 corresponding to the processing target physical segments 330 are acquired from the redundant segment management table 800 to calculate the total access frequency of the physical segments which are not in the deduplication state (S1105). When the physical segments 330 are not in the deduplication state, multiple physical segments 330 each having the same data stored therein are present inside the storage apparatus 100.

The redundant data management part 205 determines whether or not the total access frequency of redundant physical segments 330 acquired at S1105 exceeds the redundancy determination threshold (S1108).

When determining that the total access frequency exceeds the threshold of the deduplication determination (S1108, Yes), the redundant data management part 205 subtracts the access frequency of the any one of the redundant physical segments 330 from the total access frequency acquired at S1105 (S1107). After that, the redundant data management part 205 designates the selected redundant physical segment 330 as a deduplication-exempt segment (S1106) and re-determines if the threshold is exceeded at S1108.

In contrast, when determining that the total access frequency at S1105 does not exceed the threshold for the deduplication determination (S1108, No), the redundant data management part 205 updates the redundant segment management table 800 by using all the redundant physical segments 330 as deduplication targets (S1109).

Finally, the redundant data management part 205 changes the mapping destinations of all the logical segments 310 referring to the deduplication target physical segments 330 to the physical segments 330 remaining after deduplication and then finishes the processing (S1110).

With the re-deduplication control processing, the deduplication processing is executed within the access frequency threshold set for each tier in the pool 340 of each tier.

Figure 12:
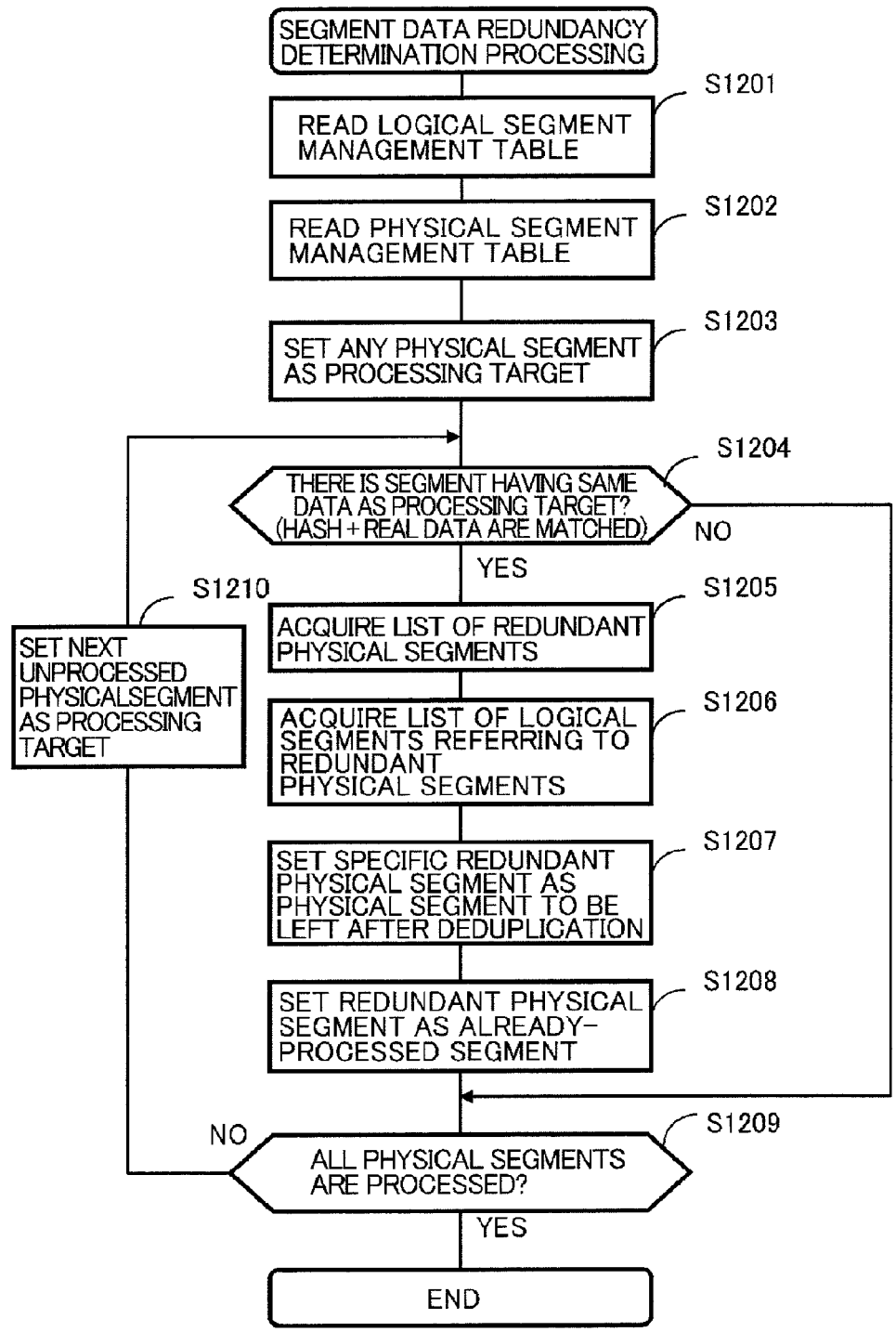
FIG. 12 is a flowchart illustrating a segment data redundancy determination processing according to an embodiment of the invention.

Hereinafter, the segment data redundancy determination processing according to this embodiment is described. FIG. 12 is a flowchart illustrating an example of the segment data redundancy determination processing. This processing is executed at the timing when the deduplication processing of FIG. 10 is executed based on the function which is provided by the redundant data management part 205 executed by the CPU 151 of the controller 150.

Firstly, the redundant data management part 205 reads the logical segment management table 400 and the physical segment management table 500 (S1201, S1202) and designates any physical segment 330 as a processing target (S1203).

Thereafter, the redundant data management part 205 determines whether or not the physical segments having the same data are present (S1204). In the deduplication technique, in general, it is determined in such a manner that a hash tag value of the stored data is calculated per physical segment to determine that the calculated hash tags are matched. Furthermore, the byte strings of data actually stored per respective physical segments are compared to determine if the same data is stored in two or more physical segments 330. It should be noted that the determination method is not limited to the above-described method, but another determination method capable of determining if the data on the two or more physical segments 330 are matched can be used.

When determining that the physical segments 330 having the same data are absent (S1204, No), the redundant data management part 205 moves the processing to S1209.

In contrast, when determining that the physical segment 330 having the same data is present (S1204, Yes), the redundant data management part 205 specifies all the physical segments which store the same data and thus have the redundant data (S1205), and specifies the logical segments 310 which are source of reference for the specified redundant physical segments 330 (S1206).

Thereafter, the redundant data management part 205 designates the specific one of the redundant physical segments 330 as the physical segment 330 remaining after deduplication (S1207), and designates the redundant physical segment 330 specified at S1205 as already-processed segment (S1208). The processing at S1207 is to select any one of the multiple redundant physical segments 330.

After that, the redundant data management part 205 determines whether or not the processing is completed on all the physical segments 330 as processing targets (S1209). When determining that the processing is not completed on all the physical segments 330 (S1209, No), the redundant data management part 205 designates the next unprocessed physical segment 330 as a processing target (S1210) and moves the processing to S1204.

In contrast, when determining that the processing is completed on all the physical segments 330 as processing targets (S1209, Yes), the redundant data management part 205 completes this processing flow.

With the above-described segment data redundancy determination processing, the redundant physical segment 330 present in the storage apparatus 100 is cancelled. Thus, the capacity usage ratio of the storage device provided in the storage apparatus 100 is improved.

Figure 13:
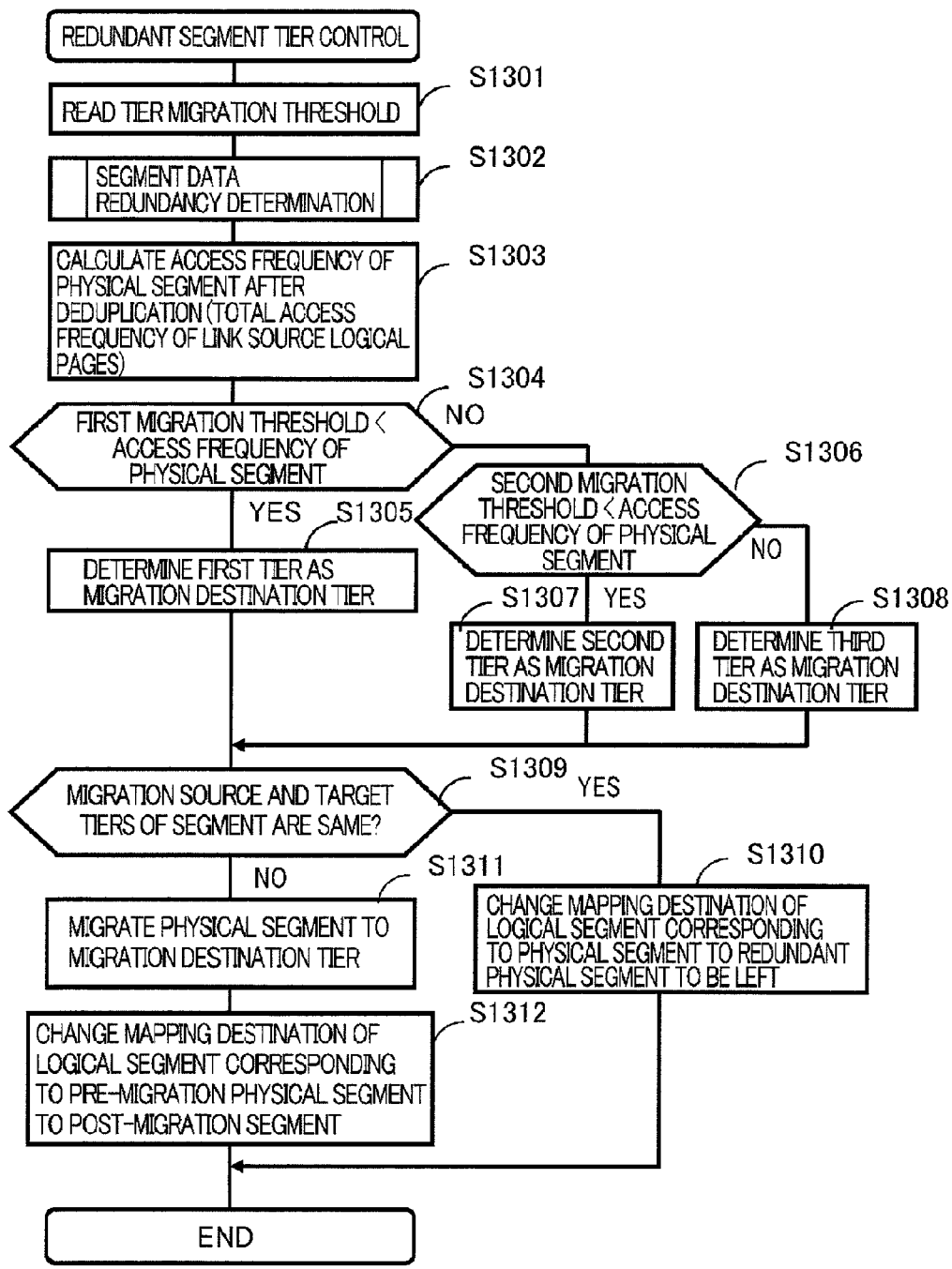
FIG. 13 is a flowchart illustrating a redundant segment tier control processing according to an embodiment of the invention.

Hereinafter, the redundant segment tier processing according to this embodiment is described. FIG. 13 is a flowchart illustrating an example of the redundant segment tier control processing. This processing performs tier control based on the change of the access frequency of the physical segment 330 accompanied with the redundant data management processing at the timing of the execution of the redundant data management such as deduplication processing or snapshot processing performing the copy processing of the virtual volume 300, on the basis of the function which is provided by the redundant data management part 205 and the tier controller 201 which are executed by the CPU 151 of the controller 150.

Firstly, the tier controller 201 reads the access frequency 620 corresponding to the tier migration threshold 610 from the threshold management table 600 (S1301).

Thereafter, the redundant data management part 205 performs the segment data redundancy determination processing described in FIG. 12 (S1302).

Then, the redundant data management part 205 acquires the access frequency of the physical segment 330 after deduplication (S1303). At this time, the tier controller 201 calculates the total access frequency of all the logical segments 310 which are mapped in the processing target physical segments as the access frequency of the physical segment 330, based on the correspondence relationship between the logical segment 310 and the physical segment 330 by taking the result of executing the step S1302 into consideration.

Next, the tier controller 201 determines whether or not the access frequency of each physical segment 330 acquired at S1303 exceeds the migration threshold to the first tier (S1304).

When determining that the access frequency of the physical segment 330 exceeds the migration threshold to the first tier (S1304, Yes), the tier controller 201 designates the first tier as the migration destination tier of the physical segment 330 (S1305).

In contrast, when determining that the access frequency of the physical segment 330 does not exceed the migration threshold to the first tier (S1304, No), the tier controller 201 determines whether or not the access frequency of the physical segment 330 exceed the migration threshold to the second tier (S1306).

When determining that the access frequency of the physical segment 330 exceeds the migration threshold to the second tier (S1306, Yes), the tier controller 201 designates the second tier as the migration destination tier of the physical segment 330 (S1307).

When determining that the access frequency of the physical segment 330 does not exceed the migration threshold to the first tier (S1306, No), the tier controller 201 designates the third tier as the migration destination tier of the physical segment 330 (S1308).

Thereafter, the tier controller 201 determines whether or not the current migration source tier of the physical segment 330 and a migration destination tier determined at S1304 to S1308 are equal to each other (S1309).

When determining that the tiers are different (S1309, No), the tier controller 201 migrates the physical segment 330 to the migration destination tier (S1311).

When determining that the tiers are identical (S1309, Yes), the tier controller 201 does not migrate the physical segment 330 but changes the mapping destination of the corresponding logical segment 310 to the remaining redundant physical segment to finish the processing (S1310).

In contrast, at 1312, the tier controller 201 changes the mapping destination of the logical segment 310 corresponding to the pre-migration physical segment 330 to the physical segment migrated at S1310 to finish the processing.

With the above-described redundant segment tier control processing, the capacity usage ratio of the storage device is improved by the deduplication processing inside the storage apparatus 100 and each physical segment 330 is migrated to a proper tier to improve the response performances and the like.

Figure 14A:
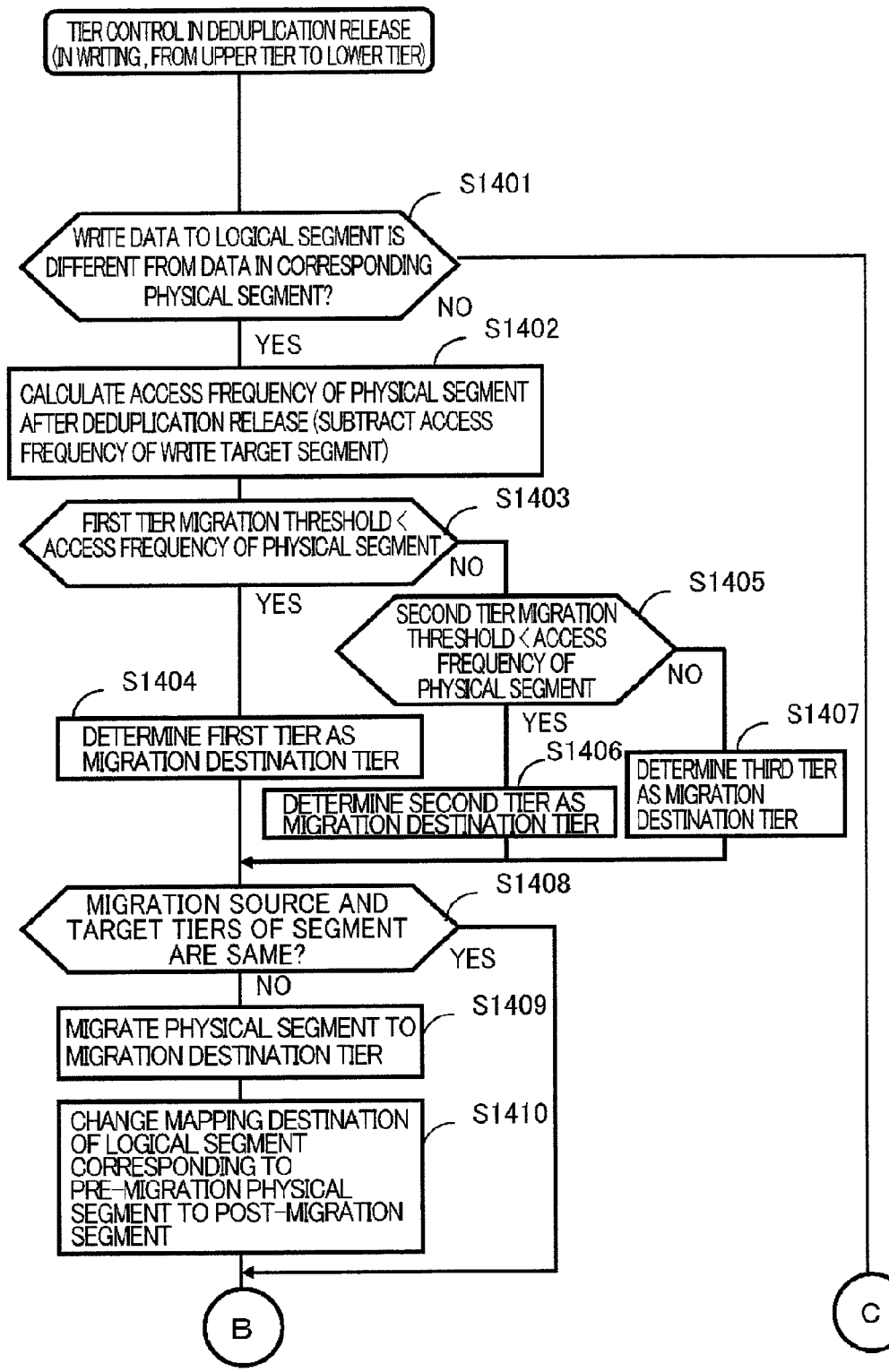
FIG. 14A is a flowchart illustrating a tier control processing performed when deduplication is released according to an embodiment of the invention.
Figure 14B:
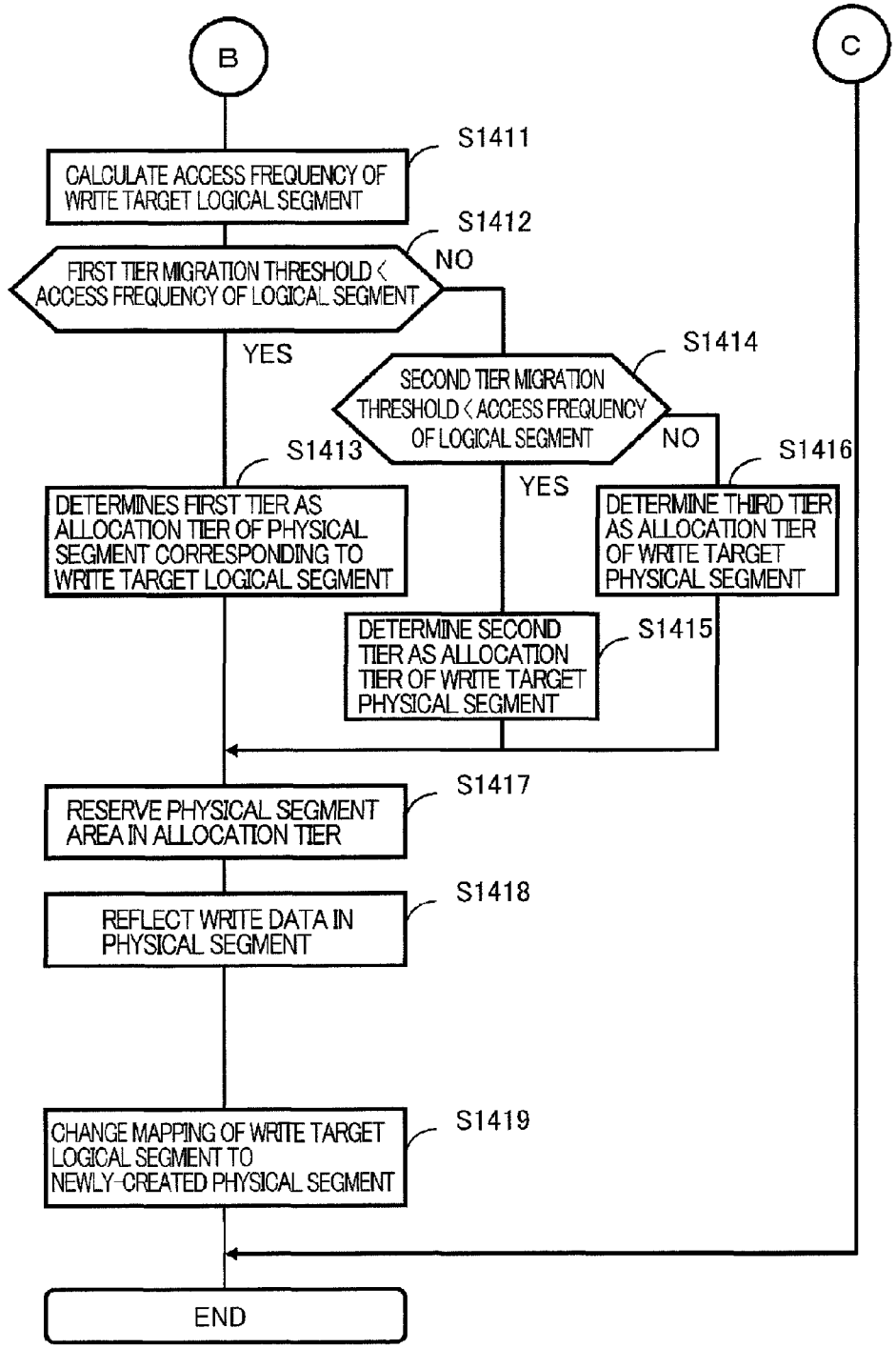
FIG. 14B is a flowchart illustrating a tier control processing performed when deduplication is released according to an embodiment of the invention.

Hereinafter, the tier control processing performed in deduplication release according to this embodiment is described. FIGS. 14A and 14B are flowcharts each showing an example of the tier control processing in deduplication release. This processing is executed at the timing when a write request is received from the host computer 180 or the like whose deduplication state is cancelled based on the function provided by the tier controller 201 and the redundant data management part 205 executed by the CPU 151 of the controller 150. Then, the tier control is performed on the physical segment 330 when the deduplication state is cancelled.

Firstly, the tier controller 201 determines at the timing when the write request is received from the host computer 180 or the like whether or not the data of the logical segment 310 which is written is different from the referred data which is stored in the physical segment 330 (S1401).

When determining that the data regarding the write request and the stored data of the corresponding physical segment 330 are identical to each other (S1401, No), the tier controller 201 finishes the processing right away.

In contrast, when determining that the data regarding the write request is different from the stored data of the corresponding physical segment 330 (S1401, Yes), the tier controller 201 acquires the access frequency of the physical segment 330 after the logical segment 310 whose data is overwritten with different data by the write processing undergoes deduplication release (S1402). In other words, the total access frequency of the remaining logical segments 310 referring the physical segment 330 deduplicated except the access frequency of the deduplication-exempt logical segment 310 is calculated.

Next, the tier controller 201 determines whether or not the access frequency of each physical segment 330 acquired at S1402 exceeds the migration threshold to the first tier (S1403).

When determining that the access frequency of the physical segment 330 exceeds the migration threshold to the first tier (S1403, Yes), the tier controller 201 designates the first tier as the migration destination tier of the physical segment 330 (S1404).

In contrast, when determining that the access frequency of the physical segment 330 does not exceed the migration threshold to the first tier (S1403, No), the tier controller 201 determines whether or not the access frequency of the physical segment 330 exceeds the migration threshold to the second tier (S1405).

When determining that the access frequency of the physical segment 330 exceeds the migration threshold to the second tier (S1405, Yes), the tier controller 201 designates the second tier as the migration destination tier of the physical segment 330 (S1406).

When determining that the access frequency of the physical segment 330 does not exceed the migration threshold to the second tier (S1405, No), the tier controller 201 designates the third tier as the migration destination tier of the physical segment 330 (S1407).

After that, the tier controller 201 determines whether or not the migration source tier in which the physical segment 330 is stored is identical to the tier determined at S1405 to S1409 (S1408).

When determining that the tiers are identical (S1408, Yes), the tier controller 201 moves the processing to S1411.

In contrast, when determining that the tiers are different from each other (S1408, No), the tier controller 201 migrates the physical segment 330 to the migration destination tier (S1409), the mapping destination of the logical segment 310 corresponding to the pre-migration physical segment 330 is changed to the physical segment 330 in the migration destination tier (S1410).

After that, the tier controller 201 acquires the access frequency of the logical segment 310 which is a new write target (S1411).

Next, he tier controller 201 determines whether or not the access frequency of the logical segment 310 which is acquired exceeds the migration threshold to the first tier (S1412).

When determining that the access frequency of the logical segment 310 exceeds the migration threshold to the first tier (S1412, Yes), the tier controller 201 designates the first tier as the migration destination tier of the physical segment 330 associated with the logical segment 310 (S1413).

In contrast, when determining that the access frequency of the logical segment 310 does not exceed the migration threshold to the first tier (S1412, No), the tier controller 201 determines whether or not the access frequency of the logical segment 310 exceeds the migration threshold to the second tier (S1414).

When determining that the access frequency of the logical segment 310 exceeds the migration threshold to the second tier (S1414, Yes), the tier controller 201 designates the second tier as the migration destination tier of the physical segment 330 associated with the logical segment 310 (S1415).

When determining that the access frequency of the logical segment 310 does not exceed the migration threshold to the second tier (S1414, No), the tier controller 201 designates the third tier as the migration destination tier of the physical segment 330 associated with the logical segment 310 (S1416).

After that, the tier controller 201 reserves the storage area for the physical segment 330 inside the allocation tier determined at S1412 to S1416 (S1417), and stores the write data in the reserved physical segment 330 (S1418).

Finally, the tier controller 201 changes the mapping destination of a write target logical segment 310 to the newly-created physical segment 330 and then finishes the processing (S1419).

As described above, according to this embodiment, a group of the virtual volumes 300 used by various host computers 180 is managed by tiers. In the storage apparatus 100 in which an allocation tier is selected for migration based on the access frequency of data, the physical segment 330 after deduplication can be allocated in a proper tier based on the access frequency of the physical segment 330 which is changed at the timing when the deduplication is performed. Thus, the capacity efficiency and cost performance of the storage 100 can be improved.

Hereinafter, a storage apparatus 100 according to a modified example of the first embodiment (hereinafter referred to as modified embodiment) is described. In the modified embodiment, a higher storage control responding to a user's need can be obtained by further introducing a user control policy setup for each tier to the configuration of the above-described first embodiment in which the deduplication control and the tier migration control are used together to improve the capacity efficiency and performances of the storage device. The basic configuration of a storage system 1 according to this embodiment is similar to that of the first embodiment. The configuration and function of this embodiment different from those of the first embodiment are described below by referring to the drawings.

Firstly, the group of data tables provided anew in this embodiment is described. For example, these data tables are stored in a memory 200 of a controller 150. FIG. 15A shows a configuration example of a tier control index management table 1500. FIG. 15B shows a configuration example of an access frequency index table 1510. FIG. 15C shows a configuration example of a performance policy index table 1530. FIG. 15D shows a configuration example of a capacity usage ratio index table 1540. These tables record indexes for setting up a control method for physical segments after deduplication. For example, the setup can be made from a management terminal 170 through a tier control index setup screen 900 shown in FIG. 9. Alternatively, these tables may be set in advance in the storage apparatus 100 before the storage apparatus 100 is operated. In this embodiment, there are shown the indexes for performing determination regarding the migration control for physical segments 330 between tiers after deduplication and the copy control for the physical segment 330 in the tier.

The tier control index management table 1500 stores indexes used for migration control of physical segment 330 between tiers and data copy control in the tiers. In the example of FIG. 15A, the tier control index 1501 is recorded in association with only a cost-oriented item 1502. In other words, the basic policy set in advance in the storage apparatus 100 of this embodiment is only the cost-oriented item, but other items such as performance-oriented item may be associated and provided. The tier control index management table 1500 is used by the tier controller 201 and the redundant data management part 205 of this embodiment.

The access frequency index table 1510 manages access frequency thresholds used for inter-tier migration control or intra-tier copy control based on the access frequency to the physical segment 330 which is provided by the storage device in each tier. In the access frequency index table 1510, items of an index type 1511, targeted tier 1512, and access frequency threshold 1513 are stored with being associated with one another. For the index type 1511, a type showing if an index to be applied is set for inter-tier control or for intra-tier control is recorded. For the targeted tier 1512, based on the access frequency, an inter-tier migration target tier or an intra-tier control target tier is stored. For the access frequency threshold 1513, a value of the access frequency to be a determination reference for inter-tier migration and intra-tier control is stored. For example, the record on the fourth line from the top of FIG. 15B shows that, with respect to the physical segment 330 in the tier level 1, data is copied within the tier in order to reduce the access frequency to the physical segment 330 when it is determined that the access frequency exceeds 150 which is the access frequency threshold 1532.

The performance policy index table 1530 is used for selecting a control method based on a performance index set in advance. In the example FIG. 15C, items of a tier 1531, a performance requirement type 1532, and an access frequency threshold 1533 are stored to be associated with one another. For the tier 1531, designated is a tier being a target to which a control based on the setting of the performance policy index table 1530 is applied. For the performance requirement type 1532, designated is a type of performance requirement serving as a determination reference on the control which is to be executed. When the performance requirement type 1532 is set to be a response performance-oriented type, a policy is employed to perform a control of inter-tier migration of the physical segment 330 to a higher-speed tier configured of a higher-speed medium. When the performance requirement type 1532 is set to be a throughput performance-oriented, the presence of multiple redundant physical segments 330 in the tier is accepted. Thus, applied is an intra-tier control policy such that the host computer 180 and the like can make a parallel access to enhance the throughput performance. The access frequency threshold 1533 designates a value of an access frequency serving as a determination reference for executing the control, for each performance requirement type 1532. In this embodiment, response performance-oriented determination is performed as the performance type requirement 1532 on the physical segment 330 having the tier level 1 for the tier 1531, and throughput performance-oriented determination is performed as the performance type requirement 1532 on the physical segment 330 having the tier level 2 for the tier 1531.

In the capacity usage ratio index table 1540, thresholds for usage ratio of the storage area to be provided is set in advance for each tier in the storage apparatus 100. This threshold is used as a condition for prioritizing the intra-tier control when it is determined that the usage ratio of the migration destination tier exceeds the threshold. In this embodiment, the usage ratio threshold 1542 is stored corresponding to the tier 1541. The example of FIG. 15D shows the tier migration condition to the tier level 0 at the time when the physical segment 330 is migrated from a lower tier to the tier level 0. Specifically, if the capacity usage ratio of the tier level 0 is equal to or lower than 60%, it is determined that the physical segment 330 is migrated from the lower tier and if the capacity usage ratio is more than 60%, the intra-tier copy control is performed in the lower tier.

Figure 16A:
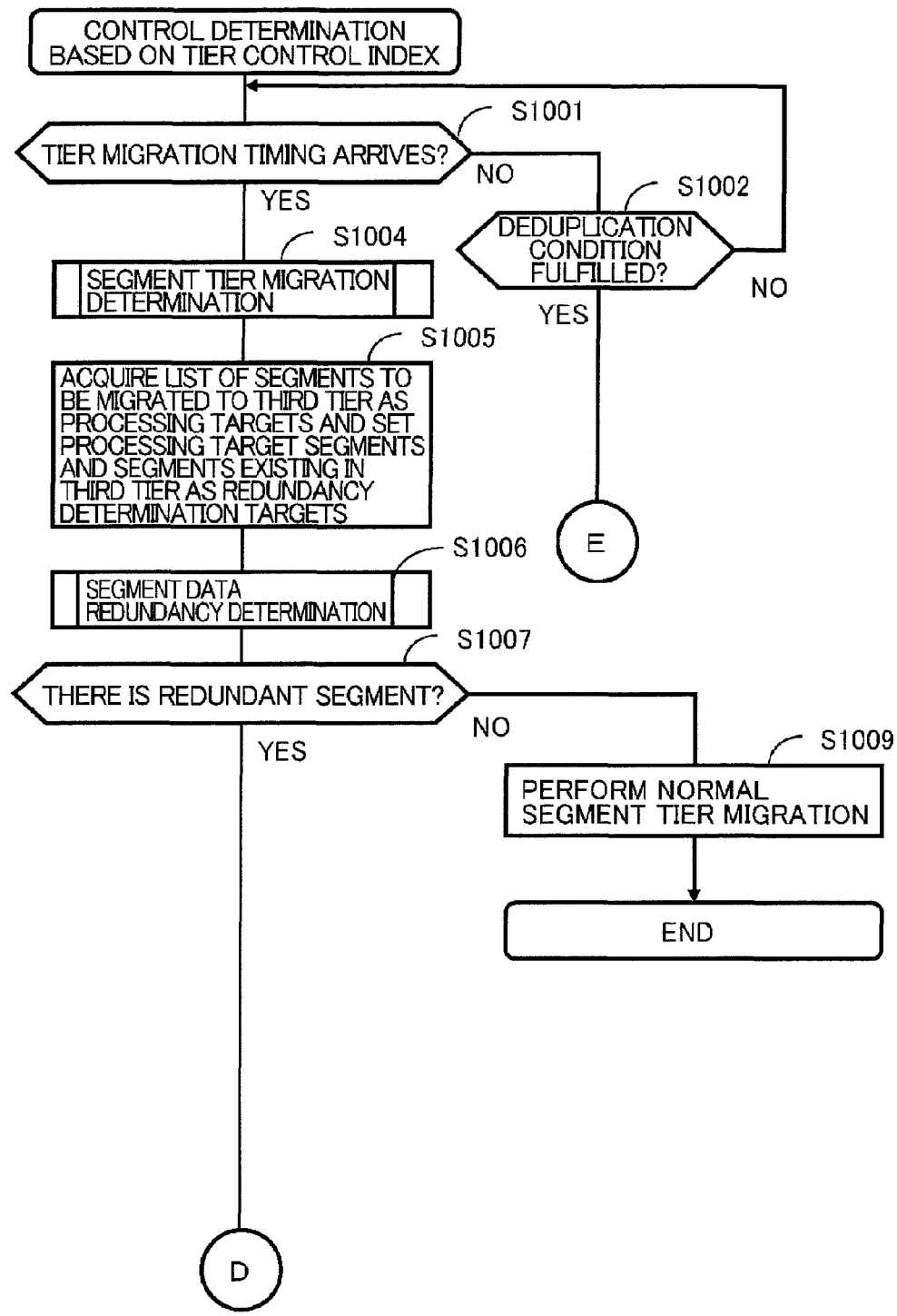
FIG. 16A is a flowchart illustrating control determination processing based on a tier control index according to an embodiment of the invention.
Figure 16B:
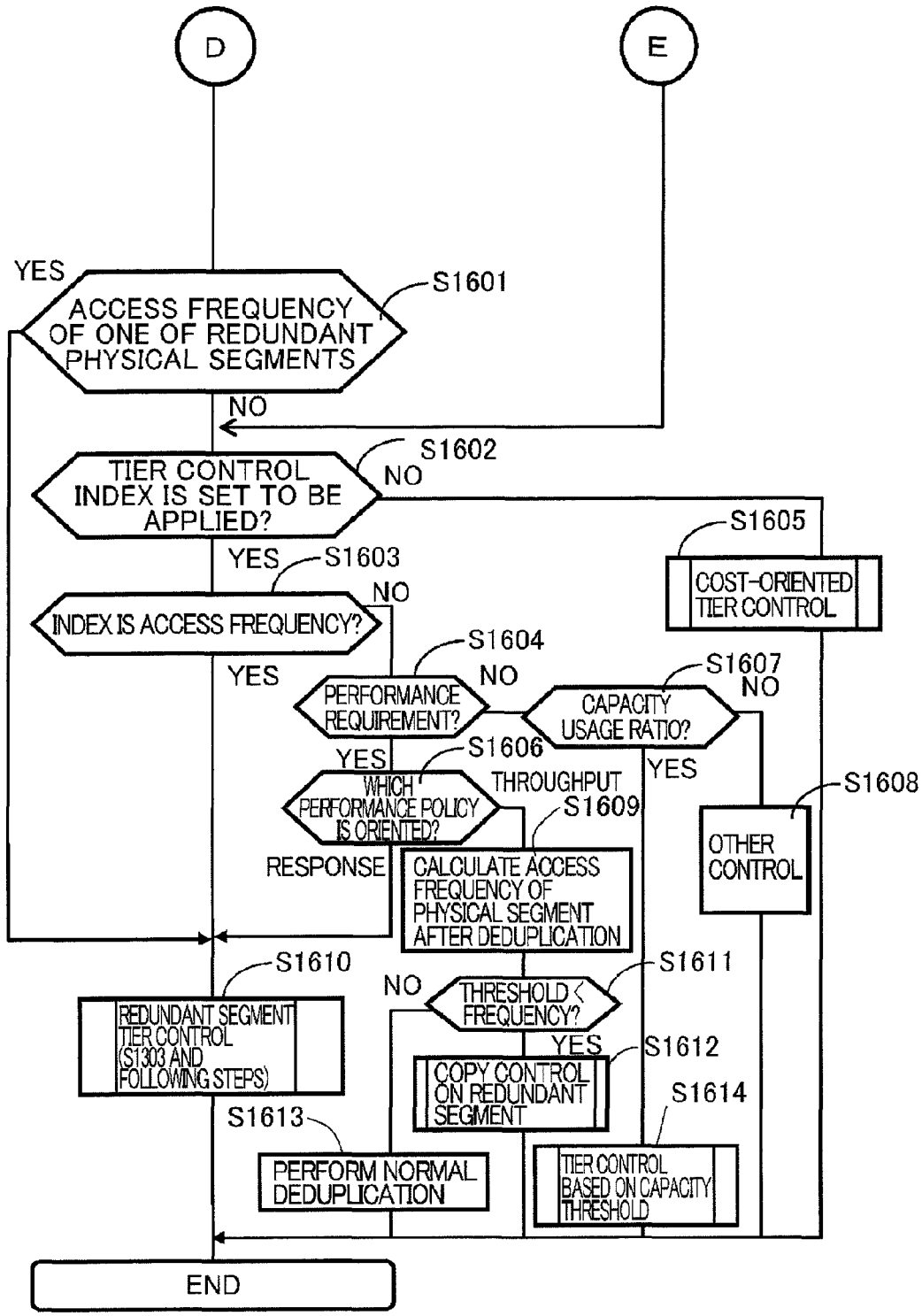
FIG. 16B is a flowchart illustrating control determination processing based on a tier control index according to an embodiment of the invention.

Hereinafter, the control processing based on the tier control index according to this embodiment is described. FIGS. 16A and 16B are flowcharts each showing an example of control processing based on the tier control index. The processing corresponds to the redundant data tier migration prerequisite processing exemplified in FIGS. 10A and 10B in the first embodiment. In the same way as the processing exemplified in FIGS. 10A and 10B, the CPU 151 of the controller 150 executes the processing by the tier controller 201 at the timing when the deduplication execution condition is fulfilled. In FIG. 16A, the data processing at steps S1001 to S1009 is the same as the processing at the corresponding steps in FIG. 10A.

When determining that there is a redundant physical segment 220 at S1007 (S1007, Yes), the tier controller 201 refers to the access frequency index table 1510, and determines whether or not the access frequency of the specific physical segment 330 exceeds the threshold for inter-tier migration (S1601).

When determining that the access frequency of the specific physical segment 330 exceeds the threshold for inter-tier migration (S1601, Yes), the tier controller 201 executes and finishes the processing of S1303 and the following steps in the redundant segment tier control processing in the first embodiment exemplified in FIG. 13 (S1610). When determining that the access frequency of the specific physical segment 330 does not exceed the threshold for inter-tier migration (S1601, No), the tier controller 201 determines whether or not the tier control index is set to be applied (S1602). The determination whether or not the tier control index is set to be applied is made by determining if any of the access frequency index table 1510, the performance policy index table 1530, and the capacity usage ratio table 1540 which are exemplified by the tier controller 201 in FIGS. 15B to 15C are set in the memory 200.

When determining that the tier control index is not set to be applied (S1602, No), the tier controller 201 executes and finishes the cost-oriented tier control according to the basic policy set in the tier control index management table 1500 (S1605). The content of the cost-oriented tier control is described later.

In contrast, when determining that the tier control index is set to be applied (S1602, Yes), the tier controller 201 determines whether or not the set index is the access frequency to the physical segment (S1603). When determining that the set index is the access frequency (S1603, Yes), the tier controller 201 executes and finishes the redundant segment tier control processing at S1610.

On the other hand, when determining that the set index is not the access frequency (S1603, No), the tier controller 201 further determines whether or not the set index is a performance requirement (S1604). When determining that the set index is the performance requirement (S1604, Yes), the tier controller 201 determines which of response performance and throughput performance the performance requirement is oriented to (S1606). When determining that the performance requirement is response performance-oriented (S1606, response), the tier controller 201 executes and finishes the redundant segment tier control processing at S1610.

In contrast, when determining that the performance requirement is throughput performance oriented (S1606, throughput), the tier controller 201 acquires the access frequency made for each physical segment after executing deduplication processing (S1609), and compares the access frequency with the threshold of migration between the tiers (S1611). When determining that the physical segment 330 having the access frequency exceeding the threshold is absent in each tier (S1611, No), the tier controller 201 executes and finishes the normal deduplication processing (S1613).

When determining that the physical segment 330 having the access frequency exceeding any of the thresholds is present (S1611, Yes), the tier controller 201 executes and finishes the copy control on the redundant segment (S1612).

When determining at S1604 that the set index is not the performance requirement (S1604, No), the tier controller 201 determines whether or not the set index is a capacity usage ratio (S1607).

When determining that the set index is the capacity usage ratio (S1607, Yes), the tier controller 201 executes and finishes the tier control based on the capacity threshold (S1614). The content of the tier control based on the capacity threshold is described later.

When determining that the set index is not the capacity usage ratio (S1607, No), the tier controller 201 executes and finishes another control processing, if any (S1608).

According to the control processing based on the tier control index of this embodiment described above, the storage apparatus 100 can be operated based on the performance that a user demands for the storage system 1 and the management policy regarding the operational cost or the like.

Figure 17A:
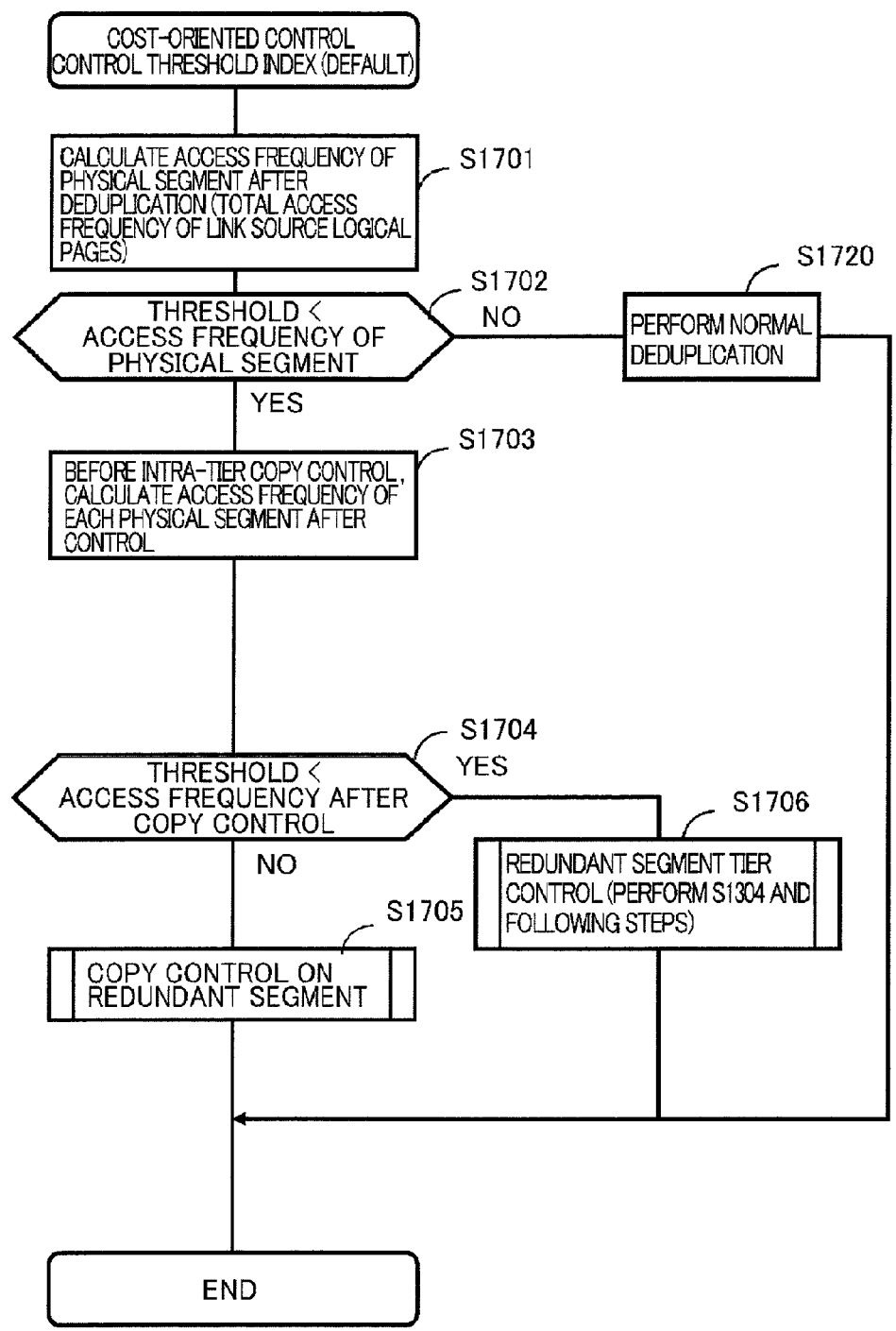
FIG. 17A is a flowchart illustrating cost-oriented control processing according to an embodiment of the invention.

Hereinafter, a cost-oriented control processing according to this embodiment is described. FIG. 17A is a flowchart illustrating an example of the cost-oriented control processing. This processing is executed in such a manner that the CPU 151 of the controller 150 executes the functions of the tier controller 201 and the redundant data management part 205 at the timing when the deduplication execution condition is fulfilled. This processing performs the intra-tier copy control and inter-tier segment migration control based on the change of the access frequency to each physical segment 330 while in the deduplication processing. Specifically, when the deduplication processing is performed, if the access frequency to the physical segment 330 after executing the deduplication processing exceeds the set threshold inside the tier, the control is performed in such a cost-oriented manner that the physical segment 330 is copied in the tier in the low-cost storage device in the lower tier, and then the physical segment 330 is migrated to the upper tier when the access frequency of the physical segment 330 is increased.

Firstly, the tier controller 201 acquires the access frequency to the physical segment 330 after deduplication (S1701). Subsequently, the tier controller 201 refers to the access frequency index table 1510 to determine whether or not the access frequency of the physical segment 330 exceeds the threshold for the intra-tier control (S1702). It should be noted that the threshold for the intra-tier control and the threshold for the inter-tier control may be commonly set.

When determining that the threshold for the intra-tier control is not exceeded (S1702, No), the tier controller 201 executes and finishes the normal deduplication processing on the physical segment 330 in each tier (S1720).

In contrast, when determining that the threshold for the intra-tier control is exceeded (S1702, Yes), the tier controller 201 acquires before performing the intra-tier copy control, the access frequencies of the physical segments 330 of both copy source and copy destination after copy control (S1703). The access frequency to the physical segment 330 after copy control can be obtained by assuming that control is performed in such a manner that, with regard to the total access frequency by the logical segments 310 associated therewith before the copy control, the logical segment showing the maximum access frequency is allocated to the physical segment 330 in the copy destination and the access frequencies by the residual logical segments 310 are covered by the physical segment 330 in the copy source.

Thereafter, the tier controller 201 determines whether or not the access frequency of each physical segment 330 after copy control exceeds the tier migration threshold (S1704).

When determining that the access frequency to each physical segment 330 after copy control does not exceeds the tier migration threshold (S1704, No), the tier controller 201 executes and finishes the copy control on the redundant segment (S1705).

In contrast, when determining that the access frequency to each physical segment 330 after copy control exceeds the tier migration threshold (S1704, Yes), the tier controller 201 executes the redundant segment tier control (S1304 and the following steps) and disposes the physical segment 330 in a proper tier, and then finishes the processing (S1706).

According to the cost-oriented control processing as described above, an intra-tier copy processing is prioritized than the inter-tier copy processing, so that a cost effective operation can be achieved, in which the storage area provided by the storage device in the low-cost lower tier is preferentially used.

Figure 17B:
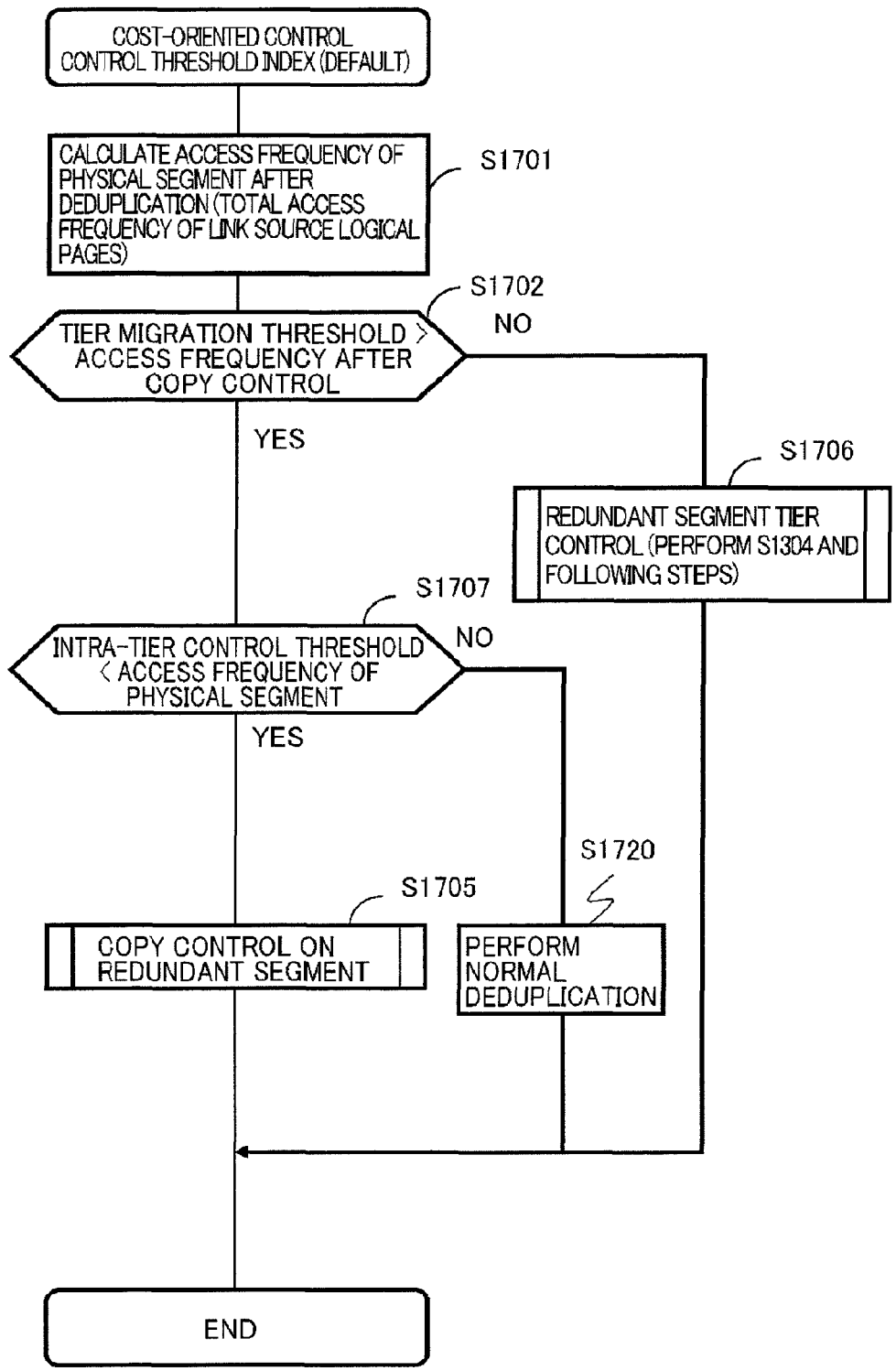
FIG. 17B is another flowchart illustrating cost-oriented control processing according to an embodiment of the invention.

FIG. 17B shows a flowchart illustrating another example of the cost-oriented tier control processing. In this example, the access frequency threshold for inter-tier migration and the access frequency threshold for determination of the intra-tier copy control, which is smaller than the access threshold for the inter-tier migration, are used. The tier controller 201 acquires the access frequency to the physical segment 330 after deduplication (S1701). Then, the tier controller 201 determines that the access frequency after copy control exceeds the tier migration threshold (S1702).

When determining that the access frequency to each physical segment 330 after copy control does not exceeds the tier migration threshold (S1702, No), the tier controller 201 executes and finishes duplication tier control (S1706).

In contrast, when determining that any of the access frequency to each physical segment 330 after copy control exceeds the tier migration threshold (S1702, Yes), the tier controller 201 refers to the access frequency index table 1510 to determine whether or not the access frequency of the physical segment 330 exceeds the threshold of the intra-tier control (S1703).

When determining that the access frequency to each physical segment 330 does not exceed the threshold of the intra-tier control (S1703, No), the tier controller 201 executes and finishes the normal deduplication processing (S1705) on the physical segment 330 in each tier.

In contrast, when determining that the access frequency to each physical segment 330 exceeds the threshold for the intra-tier control (S1703, Yes), the tier controller 201 executes and finishes the copy control processing on the redundant segment (S1704).

Figure 17C:
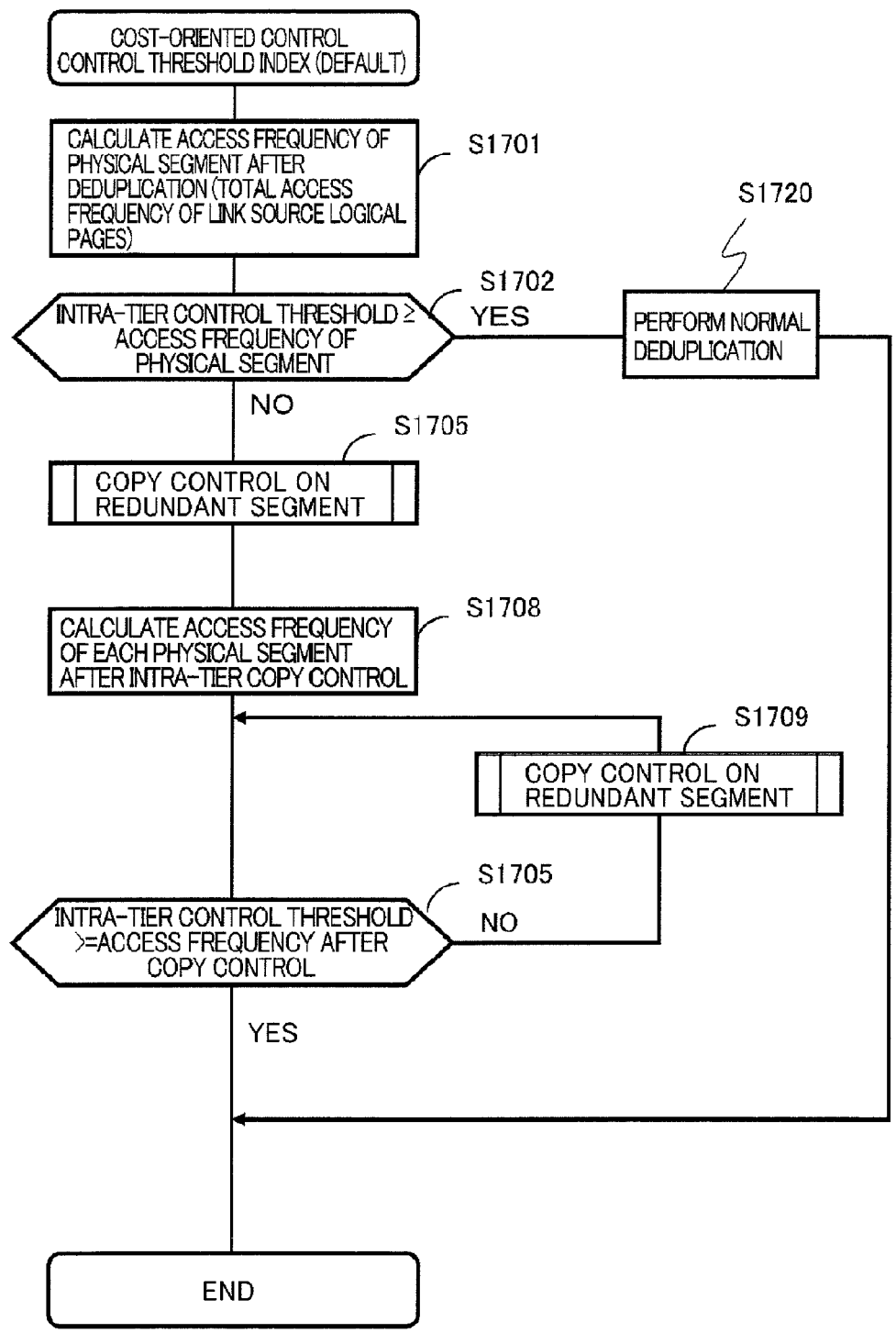
FIG. 17C is another flowchart illustrating cost-oriented control processing according to an embodiment of the invention.

FIG. 17C shows a flowchart illustrating still another example of the cost-oriented tier control processing. In this example, the processing is mainly performed for the intra-tier copy control. The tier controller 201 acquires the access frequency to the physical segment 330 after deduplication (S1701). Subsequently, the tier controller 201 refers to the access frequency index table 1510 to determine whether or not the access frequency of the physical segment 330 exceeds the threshold for the intra-tier control (S1702).

When determining that the threshold for the intra-tier control is not exceeded (S1702, Yes), the tier controller 201 executes and finishes the normal deduplication processing on the physical segment 330 in each tier (S1720).

In contrast, when determining that the threshold for the intra-tier control is exceeded (S1702, No), the tier controller 201 performs copy control on a redundant segment (S1705), and then acquires before performing the intra-tier copy control, the access frequencies of the physical segments 330 of both copy source and copy destination after copy control (S1708).

Thereafter, the tier controller 201 determines whether or not the access frequency after copy control exceeds the tier migration threshold (S1709).

When determining that the access frequency to each physical segment 330 after copy control does not exceeds the tier migration threshold (S1709, No), the tier controller 201 executes and finishes the processing right away.

In contrast, when determining that the access frequency to each physical segment 330 after copy control exceeds the tier migration threshold (S1709, No), the tier controller 201 executes the copy control on the redundant segment (S1706), and then returns to the determination processing (S1709).

Figure 18:
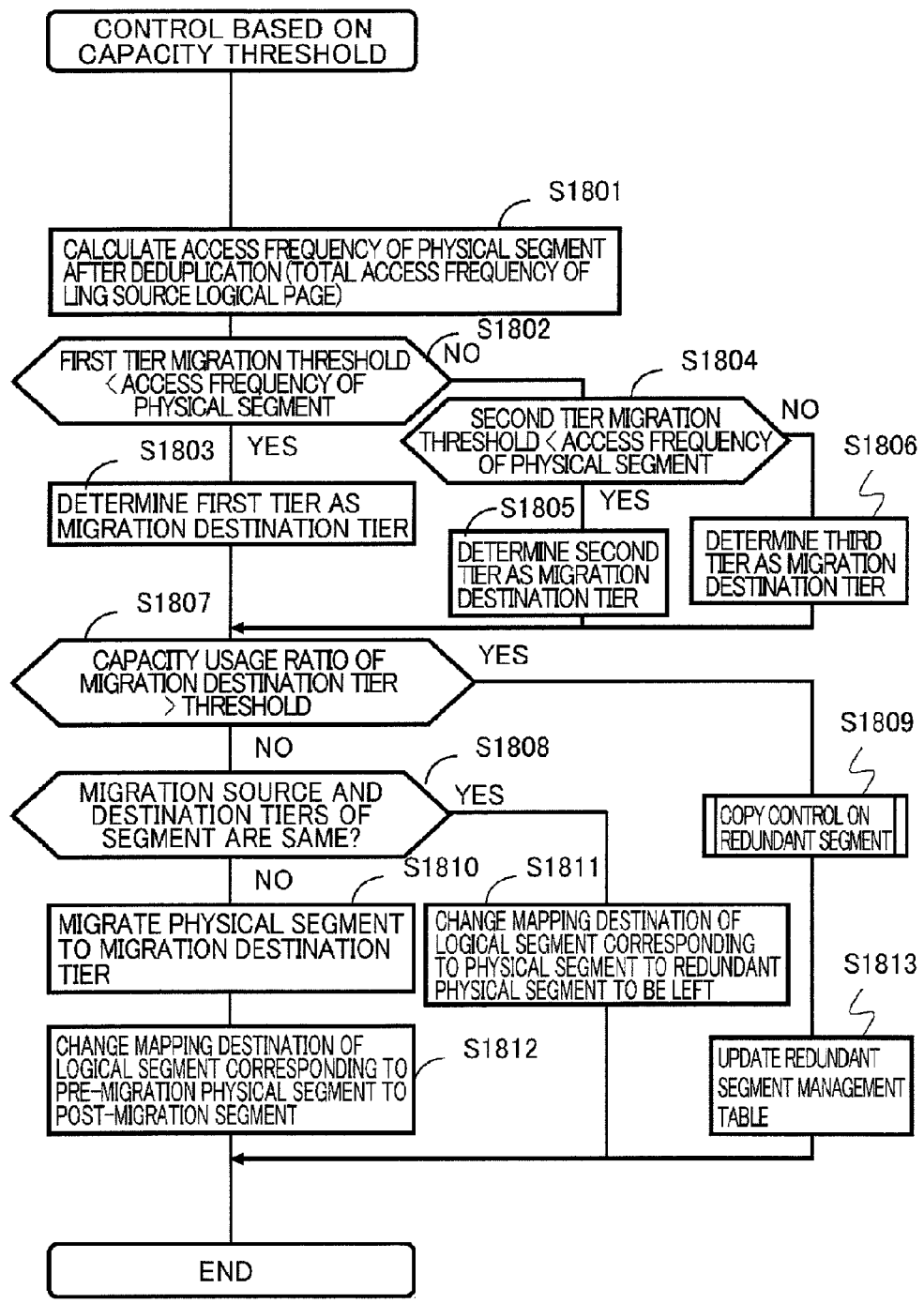
FIG. 18 is a flowchart illustrating control processing based on a capacity threshold according to an embodiment of the invention.

Hereinafter, the control based on the capacity threshold according to this embodiment is described. FIG. 18 is a flowchart illustrating an example of the control processing based on the capacity threshold. The processing is performed at the timing when the deduplication execution condition is fulfilled, in such a manner that the CPU 151 of the controller 150 executes the functions of the tier controller 201 and the redundant data management part 205. In the processing, the intra-tier copy control and the inter-tier segment migration control are performed based on the change in the access frequency to each physical segment 330 while in the deduplication processing. Specifically, such judgment is made that the intra-tier copy control is executed when the capacity usage ratio in the inter-tier migration destination exceeds the predetermined threshold at the time when the deduplication processing is executed.

First, the tier controller 201 acquires the access frequency to each physical segment 330 after the execution of the deduplication processing (S1801).

Next, the tier controller 201 determines whether or not the access frequency of each physical segment 330 acquired at S1801 exceeds the migration threshold to the first tier (S1802).

When determining that the access frequency of the physical segment 330 exceeds the migration threshold to the first tier (S1802, Yes), the tier controller 201 designates the first tier as the migration destination tier of the physical segment 330 (S1803).

In contrast, when determining that the access frequency of the physical segment 330 does not exceed the migration threshold to the first tier (S1802, No), the tier controller 201 determines whether or not the access frequency of the physical segment 330 exceeds the migration threshold to the second tier (S1804).

When determining that the access frequency of the physical segment 330 exceeds the migration threshold to the second tier (S1804, Yes), the tier controller 201 designates the first tier as the migration destination tier of the physical segment 330 (S1805).

When determining that the access frequency of the physical segment 330 does not exceed the migration threshold to the second tier (S1804, No), the tier controller 201 designates the third tier as the migration destination tier of the physical segment 330 (S1806).

After that, the tier controller 201 compares the capacity usage ratio of the migration destination tier when the physical segment 330 is migrated to the migration destination tier with the usage ratio threshold 1524 set in the capacity usage ratio index table 1540 in FIG. 15D to determine whether or not the capacity usage ratio in each tier exceeds the threshold (S1807).

When determining that the capacity usage ratio in each tier exceeds the threshold (S1807, Yes), the tier controller 201 executes the redundant segment copy control processing (S1809) and depending on the result thereof, updates the redundant segment management table 800 (S1813) and finishes the processing.

In contrast, when determining that the capacity usage ratio in each tier does not exceed the threshold (S1807, No), the tier controller 201 determines whether or not the tier in which the physical segment 330 after the execution of deduplication processing is currently allocated and the migration destination tier are the same as each other (S1808).

When determining that the tier with the physical segment 330 currently allocated and the migration destination tier are the same (S1808, Yes), the tier controller 201 changes the mapping destination of the logical segment 310 associated with the physical segment 330 to the redundant physical segment 330 caused to be remained and finishes the processing (S1811).

In contrast, when determining that the tier with the physical segment 330 currently allocated and the migration destination tier are different from each other (S1808, No), the tier controller 201 migrates the physical segment 330 to the migration destination tier (S1810), and changes the mapping destination of the logical segment 310 associated with the pre-migration physical segment 330 to the post-migration physical segment 330, and finishes the processing (S1812).

With the control processing based on the capacity threshold as described above, achieved is an effective storage capacity management based on the desired capacity usage ratio for each tier including storage devices having different types of the storage apparatus 100.

Figure 19:
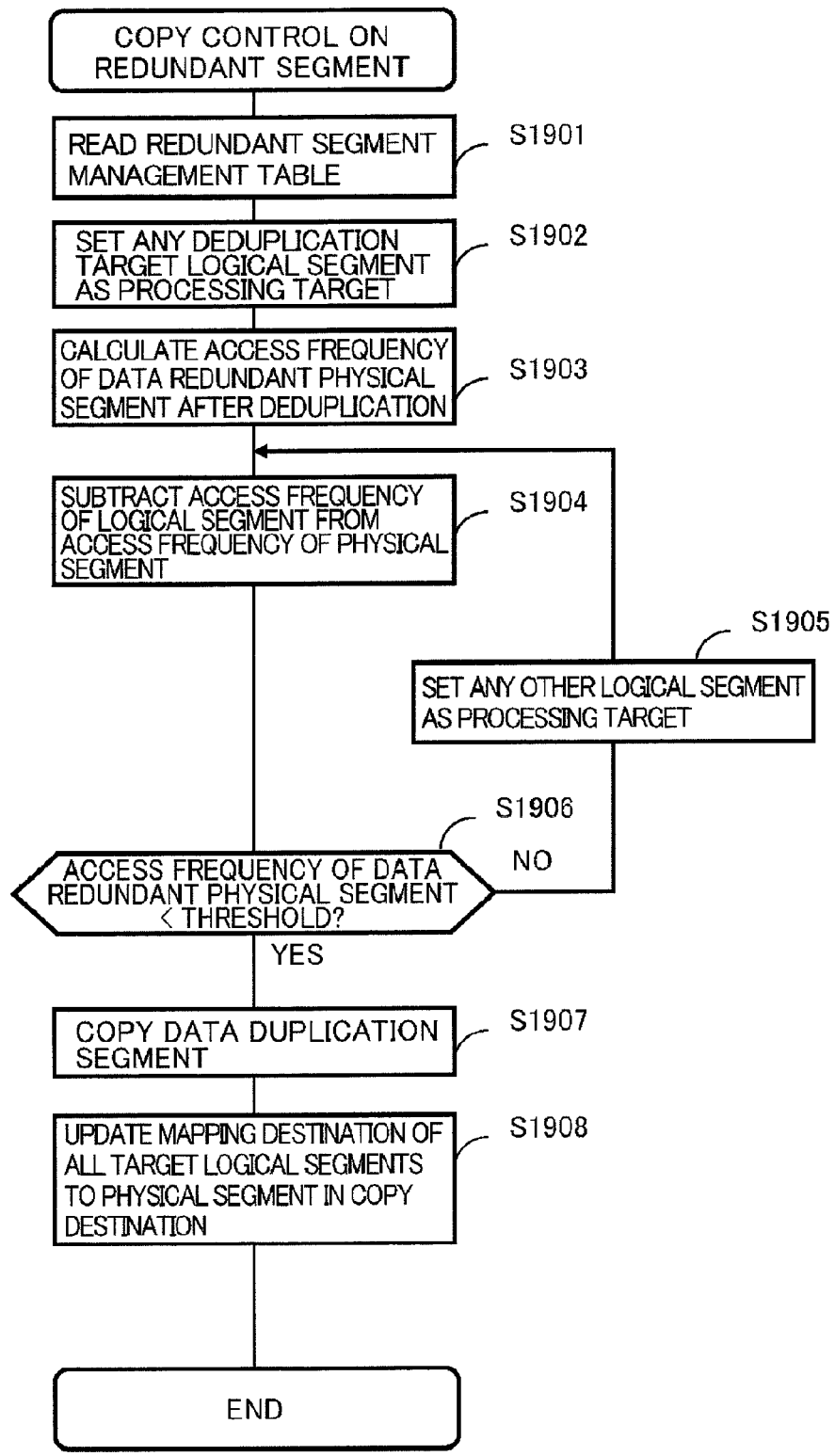
FIG. 19 is a flowchart illustrating copy control processing of redundant segment according to an embodiment of the invention.

Hereafter, the copy control processing on the redundant segment according to this embodiment is described. FIG. 19 is a flowchart illustrating an example of the copy control processing on the redundant segment. The processing is performed in such a manner that the CPU 151 of the controller 150 executes the function of the redundant data management part 205 at the timing when the deduplication processing execution condition is fulfilled. In the processing, the copy control is performed on the physical segment 330 in the tier as the control determined based on the change in the access frequency of the physical segment 330.

Firstly, the redundant data management part 205 reads the redundant segment management table 800 (S1901), any deduplication-processing-target logical segment 310 is set as a processing target (S1902).

Thereafter, the redundant data management part 205 acquires the access frequency after executing the deduplication processing on the data redundant physical segment 330 which is the physical segment 330 storing the same data, by adding up the access frequencies corresponding to the physical segments 330 (S1903).

Then, the redundant data management part 205 subtracts the access frequency of the logical segment 310 set as a processing target from the access frequency of the physical segment 330 (S1904).

After that, the redundant data management part 205 determines whether or not the access frequency of the data redundant physical segment 330 calculated at S1904 exceeds the threshold for the intra-tier control (S1906).

When determining that the access frequency of the data redundant physical segment 330 does not exceed the threshold for the intra-tier control (S1906, No), the redundant data management part 205 sets any logical segment 310 as a processing target and returns to S1904 (S1905).

In contrast, when determining that the access frequency of the data redundant physical segment 330 exceeds the threshold for the intra-tier control (S1906, Yes), the redundant data management part 205 copies the data redundant physical segment 330 in the same tier (S1907).

Then, the redundant data management part 205 changes the mapping destinations of all the copy target logical segments 310 in the redundant segment management table 800 to the physical segment 330 in the copy destination before finishing the processing (S1908).

With the above-described copy control processing on the redundant segment according to this embodiment, the intra-tier copy processing is executed so that the access frequency of the physical segment allocated in each tier would not exceed the threshold set for each tier. Thus, the performance in each tier can be prevented from being deteriorated.

Second Embodiment

Figure 20:
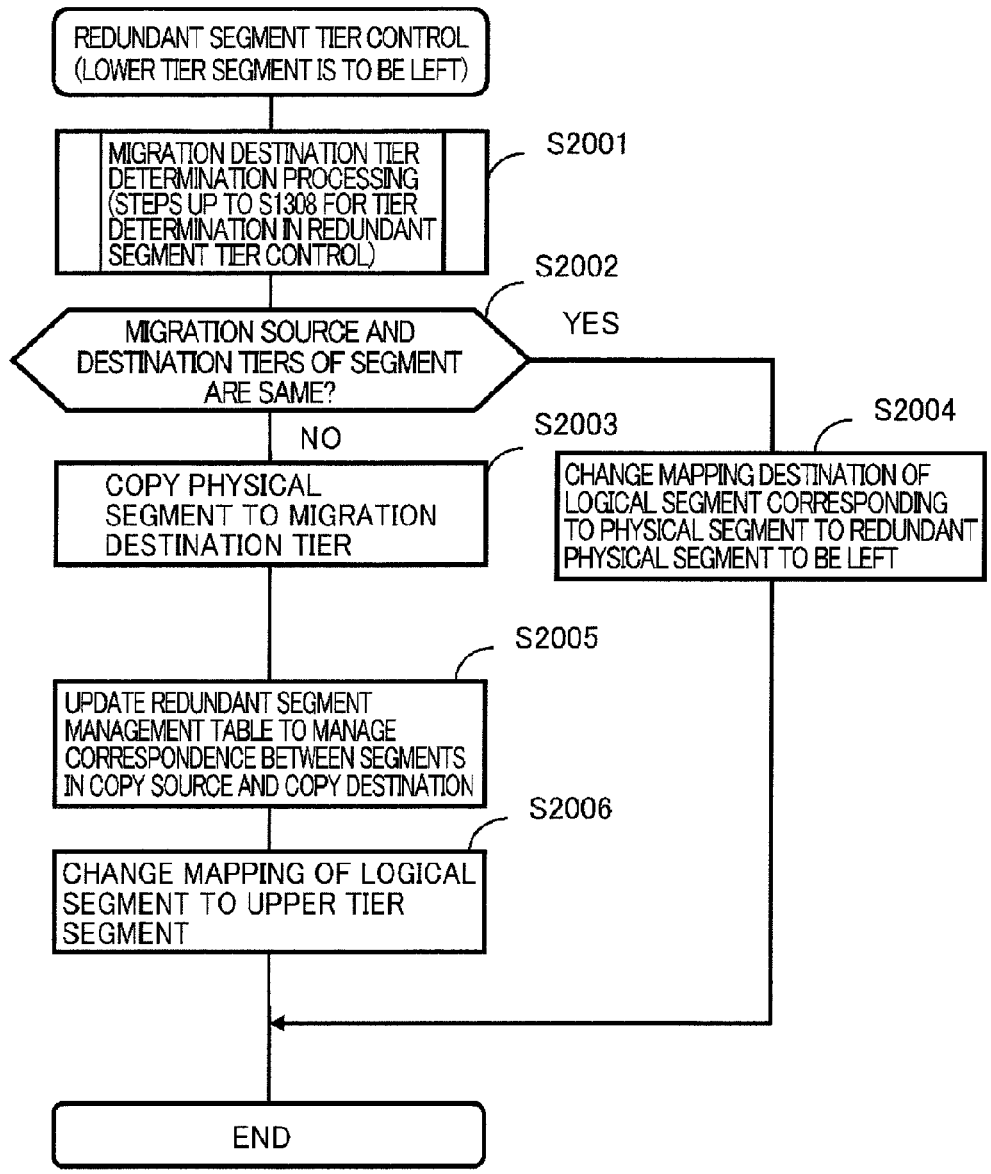
FIG. 20 is a flowchart illustrating redundant segment tier control processing according to an embodiment of the invention.

Hereinafter, the description is given to another embodiment of the redundant segment tier control processing described in the first embodiment. FIG. 20 is a flowchart illustrating another example of the redundant segment tier control processing. This processing is performed in such a manner that the CPU 151 of the controller 150 executes the tier controller 201 and the redundant data management part 205 at the timing when the deduplication processing execution condition is fulfilled and the redundant data management such as snapshot processing is executed. Then, the inter-tier control based on the change in the access frequency to the physical segment 330 while in the redundant data management execution. In particular, the processing is characterized by the processing causing the physical segment 330 to remain also in the lower tier when the physical segment 330 is migrated to the upper tier after executing the deduplication processing.

Firstly, at S2001, the migration destination tier determination processing is executed. In this step, the processing up to S1308 in the redundant segment tier control processing of the first embodiment shown in FIG. 13 is executed.

Thereafter, for each physical segment 330 whose migration destination tier is determined at S2001, the tier controller 201 determines whether or not the tier with the physical segment 330 currently stored and the migration destination tier are the same as each other (S2002).

When determining that the tier with the physical segment 330 currently stored and the migration destination tier are the same as each other (S2002, Yes), the tier controller 201 changes the mapping destination of the logical segment 310 associated with the physical segment 330 to the redundant physical segment 330 to be left before finishing the processing (S2004).

In contrast, when determining that the tier with the physical segment 330 currently stored and the migration destination tier are different from each other (S2002, No), the tier controller 201 copies the physical segment 330 to the migration destination tier (S2003), and records the correspondence relationship between the segments in the copy source and copy destination in the redundant segment management table 800 (S2005).

Figure 21:
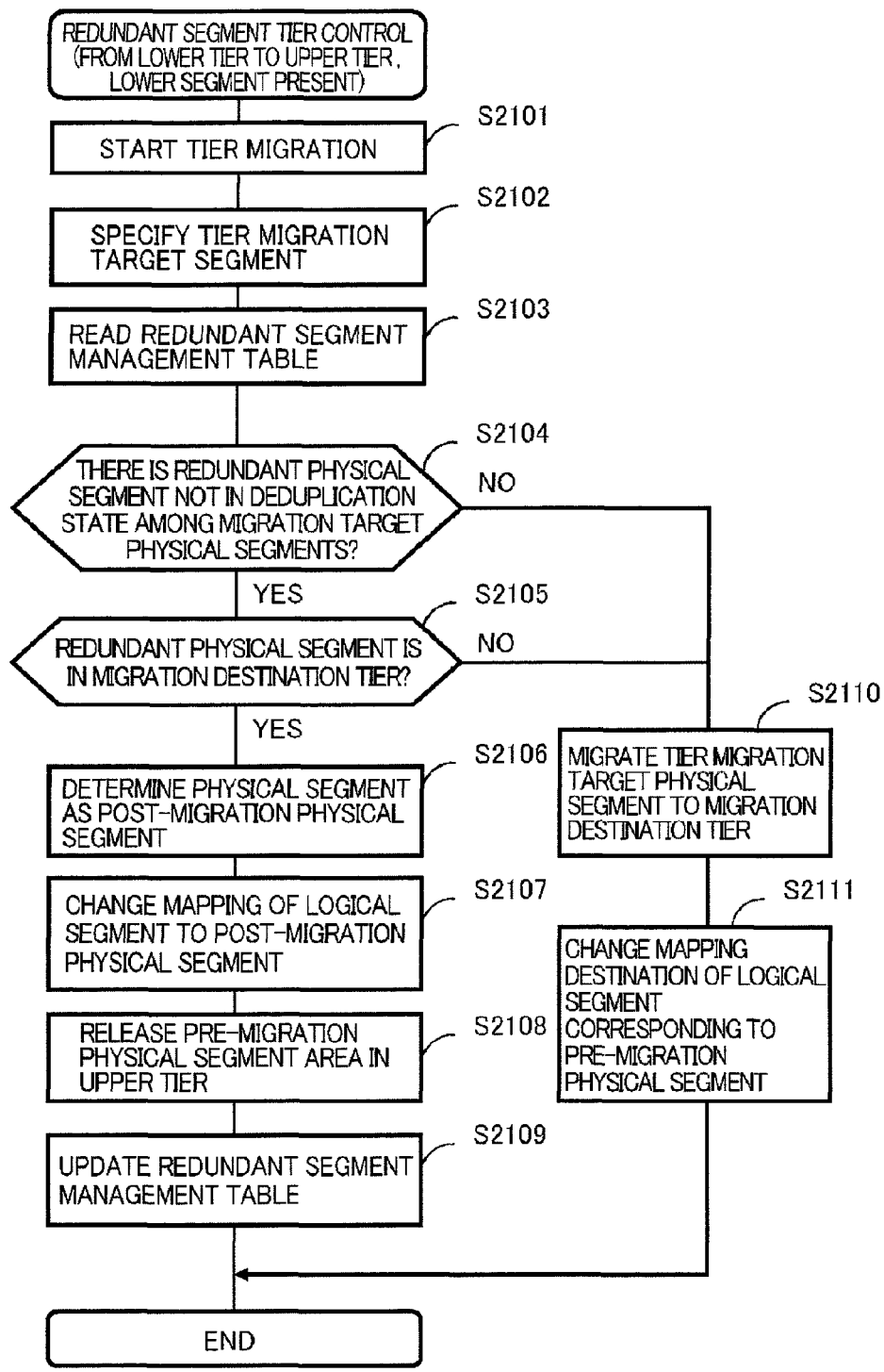
FIG. 21 is a flowchart illustrating redundant segment tier control processing according to an embodiment of the invention.

Thereafter, the tier controller 201 changes the mapping of the logical segment 310 associated with the physical segment 330 in the copy source to the physical segment 330 migrated to the upper tier before finishing the processing (S2006). Hereinafter, still another embodiment of the redundant segment tier control processing is described. FIG. 21 is a flowchart illustrating the other example of the redundant segment tier control processing. This processing is performed at the timing when the deduplication processing execution condition is fulfilled and the redundant data management such as snapshot processing is executed, in such a manner that the CPU 151 of the controller 150 executes the functions of the tier controller 201 and the redundant data management part 205. The inter-tier control is executed based on the change in the access frequency to the physical segment 330 while in the redundant data management execution. In particular, this processing is characterized by the processing in which the inter-tier migration of the physical segment 330 from the upper tier to the lower tier is performed with the physical segment 330 having the redundant data left in the lower tier as shown in FIG. 20.

Firstly, the tier controller 201 starts the inter-tier migration processing on the physical segment 330 based on the normal tier control function of the storage apparatus 100 described with regard to the first embodiment (S2101).

Subsequently, the tier controller 201 specifies the physical segment 330 targeted for the inter-tier migration at S2101 (S2102) and reads the redundant segment management table 800 (S2103).

Thereafter, the tier controller 201 determines whether or not the redundant physical segment 330 which is currently not in a deduplication state is present among the migration target physical segments 330 (S2104).

When determining that the redundant physical segment 330 is absent (S2014, No), the tier controller 201 migrates the physical segment 330 set as a tier migration target to the migration destination tier (S2110), and changes the mapping destination of the logical segment 310 associated with the pre-migration physical segment to the post-migration physical segment 330 to finish the processing (S2111).

In contrast, when determining that the redundant physical segment 330 is present (S2104, Yes), the tier controller 201 determines whether or not the redundant physical segment 330 is present in the migration destination tier (S2105). When determining that the redundant physical segment 330 is absent in the migration destination tier (S2105, No), the tier controller 201 moves the processing to S2110.

In contrast, when determining that the redundant physical segment 330 is present in the migration destination tier (S2105, Yes), the tier controller 201 designates the physical segment 330 as the post-migration segment 330 (S2106).

Then, the tier controller 201 changes the mapping of the logical segment 310 associated with the physical segment 330 set as a migration target (S2107). Furthermore, the tier controller 201 releases the area of the pre-migration physical segment 330 in the upper tier (S2108), and updates the redundant physical segment management table 800 before finishing the processing (S2109).

Third Embodiment

In the first and second embodiments, the description is given to the control processing causing the storage apparatus 100 to be effectively operable by combining the inter-tier migration control and intra-tier copy control on the physical segment 330 if needed in the configuration in which multiple tiers whose storage devices have different types from each other are provided in the same storage apparatus 100.

In this embodiment, described is the deduplication control processing in the case where a virtual volume 300 being used by a host computer or the like is migrated between two different storage apparatuses 100.

Figure 22:
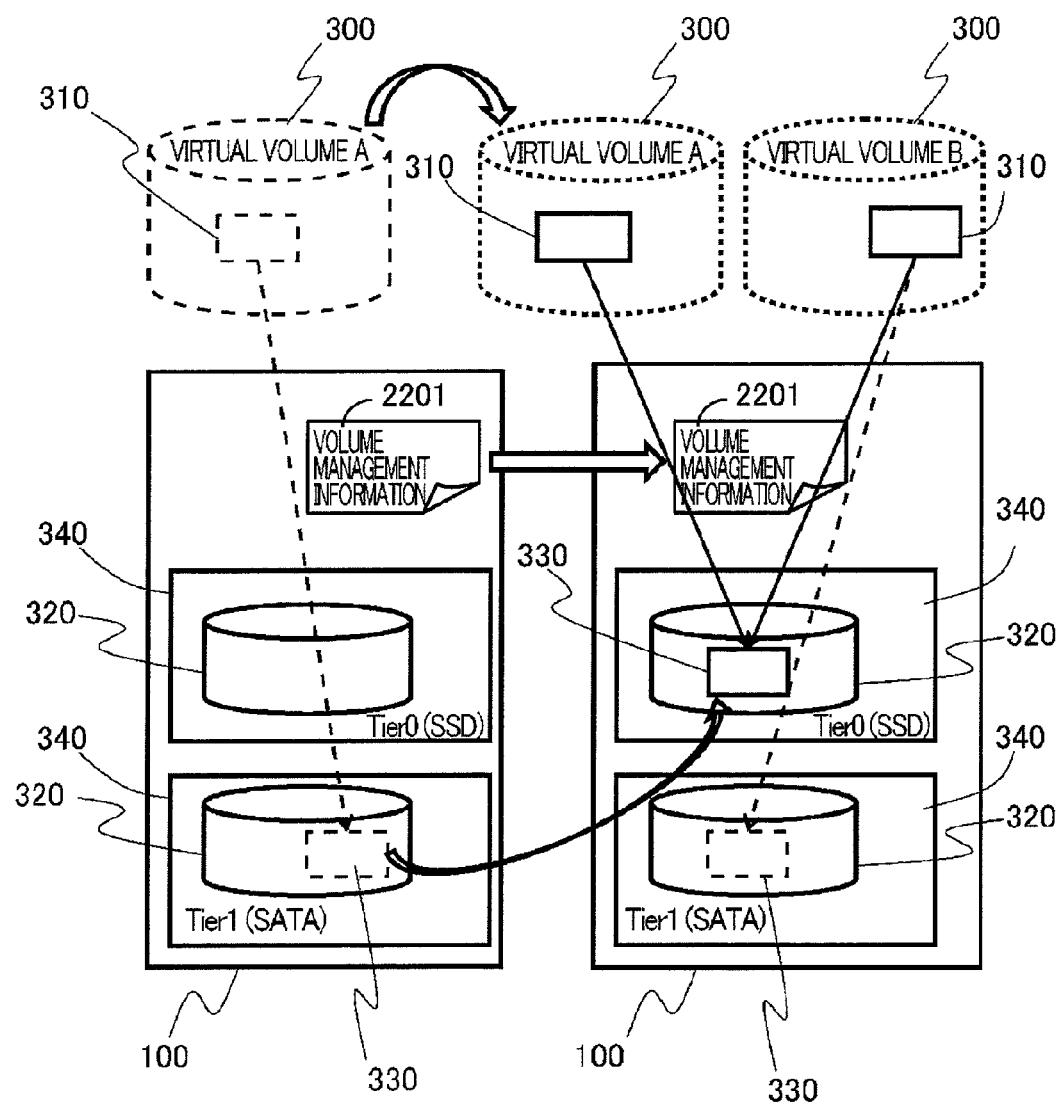
FIG. 22 is a schematic diagram of deduplication processing performed when data is migrated between devices according to an embodiment of the invention.

FIG. 22 is a schematic diagram showing the outline of the deduplication control processing when the volume is migrated between the storage apparatuses. The configuration of the storage apparatus 100 is basically similar to that of the storage apparatus 100 of the first embodiment exemplified in FIG. 1. The information needed for managing volumes such as a logical volume, a physical volume, and a segment are collectively referred to as volume management information. Specifically, the volume management information includes, for each virtual volume 300, the contents of, for example, the physical segment management table 500, the tier management table 700, the threshold management unit 206, the redundant data management part 205, the threshold management table 600, the logical segment management table 400, and the redundant segment management table 800, which are described in the first embodiment. The deduplication processing is performed between one physical segment 330 and another physical segment 330 in the migration destination storage apparatus 100. Then a tier allocated in the migration destination storage apparatus 100 is determined to dispose the physical segment 330.

FIG. 22 shows the configuration in which the virtual volume A belonging to the storage apparatus 1 on the left side is migrated to the storage apparatus 2 on the right side. The virtual volume B remains in the storage apparatus 2.

The data migration between the storage apparatuses 100 per volume, for example, is performed according to a change in the state of performance or operation such as swapping of storage devices or exchange of storage apparatuses 100.

The data of the physical segment 330 which belongs to the virtual volume A is migrated to the storage apparatus 2 along with the migration of the virtual volume A between the storage apparatuses 100.

Figure 23:
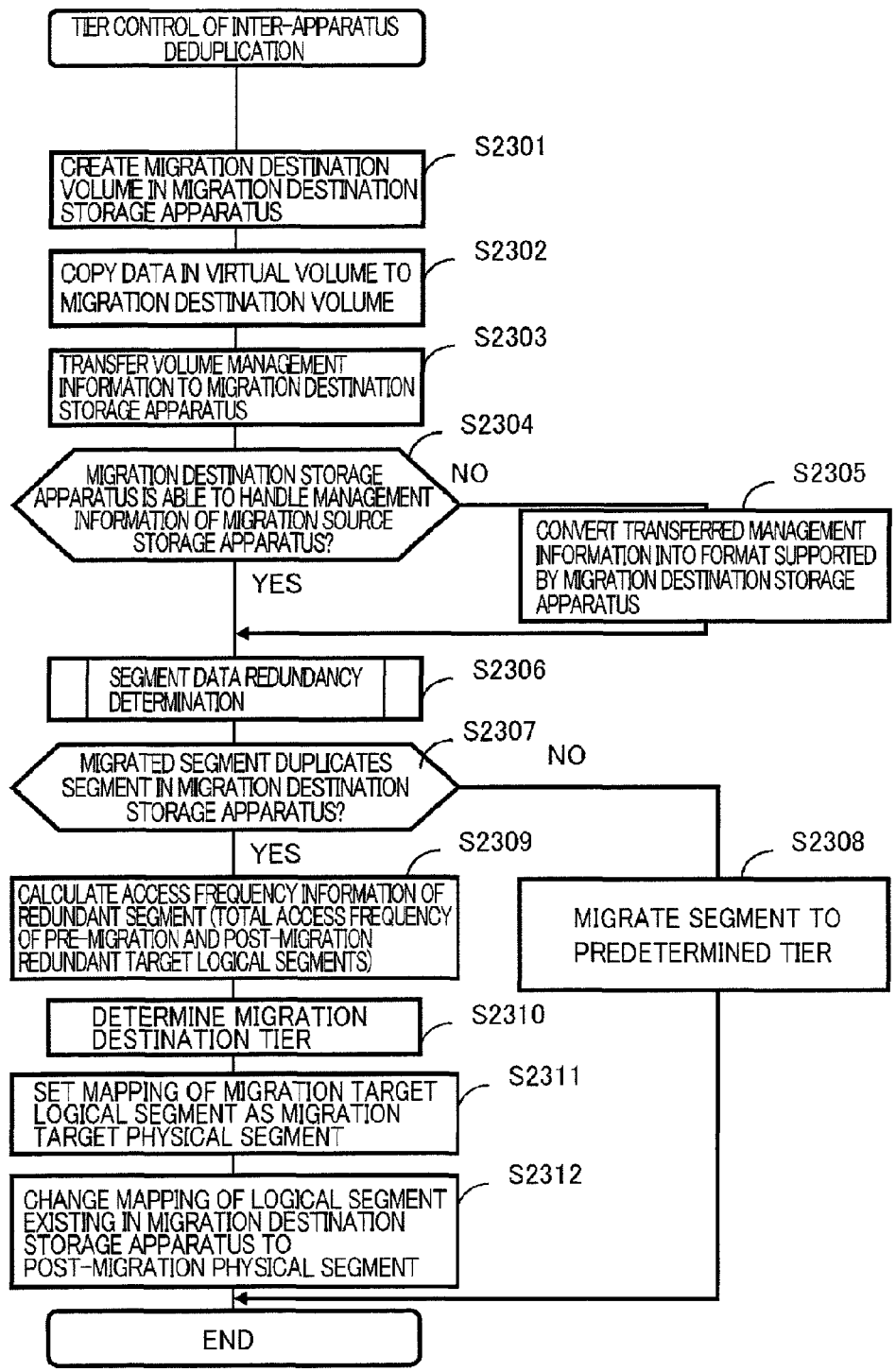
FIG. 23 is a flowchart illustrating deduplication tier control processing performed when data is migrated between devices according to an embodiment of the invention.

Hereinafter, the description is given to an example of processing for executing the volume migration processing between the storage apparatuses 100 as described in FIG. 22. FIG. 23 is a flowchart illustrating an example of the tier control processing of inter-apparatus deduplication according to this embodiment. This processing is executed upon performing the redundant data management by the tier controller 201 and the redundant data management part 205 in such a case as the fulfillment of the deduplication processing condition when the CPU 151 of the controller 150 copies the data between the devices. This processing is characterized by performing inter-tier control based on the change in the access frequency to the physical segment 330 in the redundant data management processing.

Firstly, the tier controller 201A creates migration destination volume 300B in the migration destination storage apparatus 100B when starting the inter-apparatus volume migration processing (S2301), and copies the data stored in the virtual volume 300A from the migration source storage apparatus 100A to the virtual volume 300A in the migration destination storage apparatus 100B (S2302).

Subsequently, the tier controller 201 transfers the volume management information 2201 to the migration destination storage apparatus 100 (S2303). The volume management information 2201 can be transferred through the management LAN 117 in this embodiment, but may be transferred through another communication line.

Thereafter, the tier controller 201 determines whether or not the migration destination storage apparatus 100 can handle the volume management information of the migration destination storage apparatus 100 (S2304). When determining that the migration destination storage apparatus 100 can handle the volume management information (S2304, Yes), the tier controller 201 performs redundancy determination processing on segment data (S2306).

In contrast, when determining that the migration destination storage apparatus 100 cannot handle the volume management information (S2304, No), the tier controller 201 converts the transferred management information into a format supported by the migration destination storage apparatus 100 before moving the processing to S2306. (S2305)

After that, the tier controller 201 determines whether or not the segment to be migrated is a segment that duplicates the segment already existing in the migration destination storage apparatus 100 (S2307).

When determining that the segment does not duplicate the existing segment (S2307, No), the tier controller 201 migrates the segment in a predetermined tier before finishing the processing (S2308).

In contrast, when determining that the segment duplicates the existing segment (S2307, Yes), the tier controller 201 acquires the access frequency information of the redundant segment from the volume management information 2011 (S2309). At this time, the access frequency information after deduplication is the total access frequency of a pre-migration segment in the migration source storage apparatus 100 and the access frequency information of the segment that duplicates the pre-migration segment in the migration destination storage apparatus 100.

Thereafter, the tier controller 201 determines a proper tier matching with the condition based on the access frequency information acquired at S2309 (S2310) and sets the mapping destination of the migration target logical segment 30 as the physical segment 330 after migration (S2311).

Then, among the logical segments 310 existing in the device in the migration destination, the tier controller 201 changes the mapping destination of the segment determined as the redundant segment to the post-migration physical segment 330 before finishing the processing (S2312).

With the processes described above, the effects which are the same as those of the first embodiment can be obtained even when data migration is performed between different storage apparatuses.

Fourth Embodiment

Figure 24:
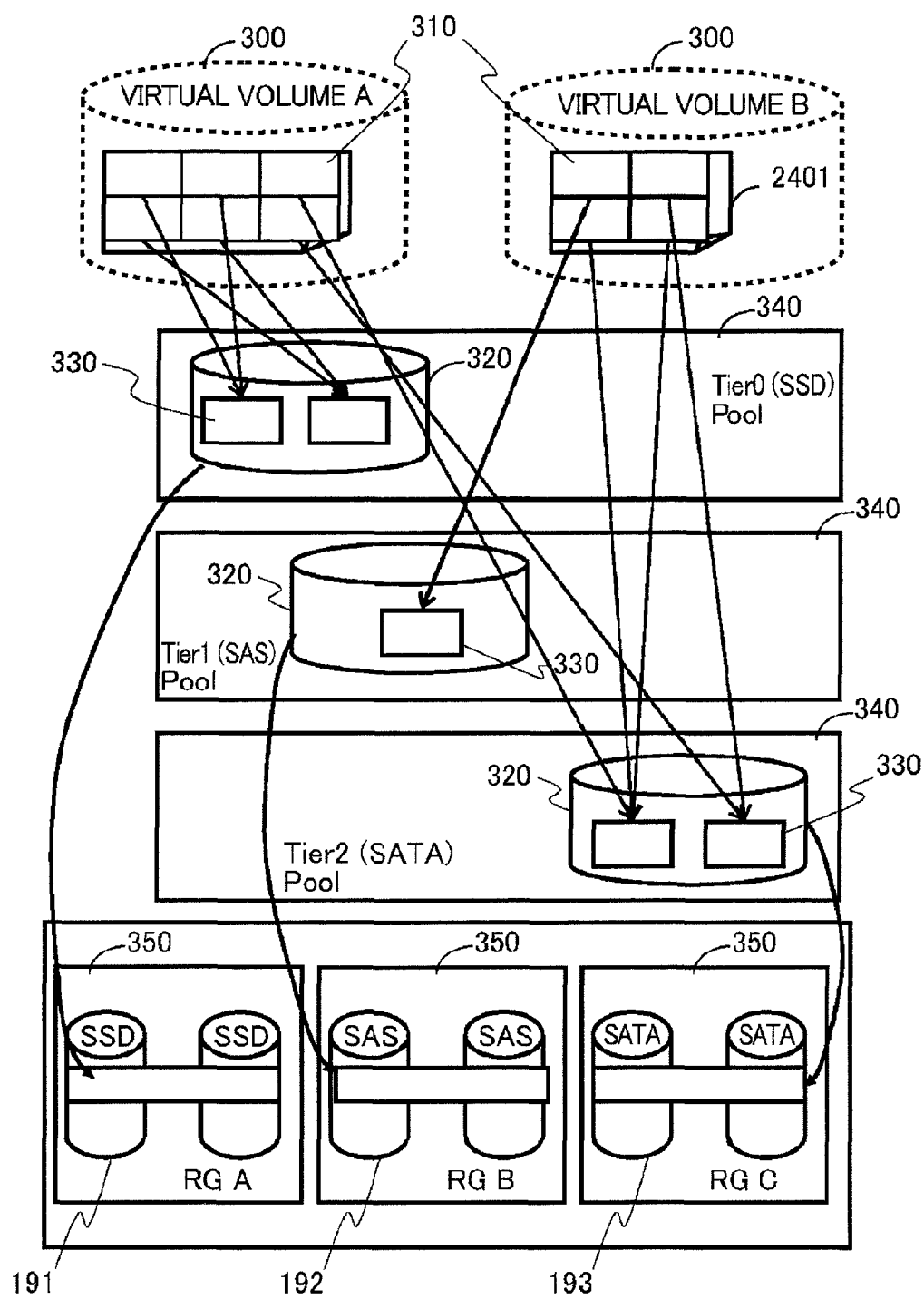
FIG. 24 is a schematic diagram showing outline of file deduplication processing according to an embodiment of the invention.

Hereinafter, another embodiment of the invention is described. FIG. 24 is a schematic configuration diagram in the case where tier control equivalent to that of the first embodiment is incorporated into the deduplication processing on a file.

This embodiment is applicable to the case where deduplication processing is performed at a block data level in the storage apparatus in which data is managed for every file unit like NAS (Network Attached SCSI). In the configuration exemplified in FIG. 24, the configuration of the storage apparatus 100 is similar to that of the first embodiment and a file managed by an NAS device or the like is managed within the storage apparatus 100 by a segment unit having a certain size. The deduplication processing on some block 2401 forming the file is executed by a physical segment 330 unit and tier control is performed on that result. Also, this embodiment is similar to the first embodiment in that the storage apparatus 100 manages information regarding associations among a tier, the physical segment 330, the logical segment 310, the information including the access frequency information for each segment. The embodiment employs a management system managing associations of the data block 2401 included in the file with each logical segment 310. Accordingly, the configuration shown in the first embodiment can be adapted as it is to the file management.

According to these embodiments of the present invention described above in details, in the storage device with a tier control technique, when executing deduplication processing, snapshot processing and the like in order to improve capacity usage ratio by managing and deleting a redundant data, an access frequency of the physical segment after deduplication is acquired in advance, and the physical segment can be disposed in a tier under a proper condition by managing multiple access frequencies of the logical segments in association with each other, the logical segments referring to the physical segment after the deduplication processing.

It should be noted that these embodiments as described above are provided for easy understanding of the present invention and are not intended to limit the invention. The invention may be modified or improved without departing from the content of the invention, and also includes equivalents thereof.

The invention claimed is:

1. A storage apparatus providing a logical storage area for storing data to an external apparatus, comprising:
 a plurality of storage devices each providing a physical storage area for storing the data, the storage devices being different from each other in a device property including data input/output performance;
 a capacity virtualization part managing the physical storage areas of the storage devices as unit physical storage areas each having a predetermined storage capacity and managing the unit physical storage areas in association with a plurality of unit logical storage areas forming the logical storage area;
 a tier controller managing the plurality of unit physical storage areas by classifying the unit physical storage areas into a plurality of tiers, the unit physical storage areas provided by the storage devices having the different device properties; and
 a redundant data management part managing redundant unit storage areas which are a plurality of the unit physical storage areas storing the same data, wherein
 the tier controller classifies each of the unit physical storage areas into one of the tiers by use of a threshold of an access frequency from the external apparatus through the unit logical storage areas,
 the tier controller calculates as the access frequency an access frequency to each of the unit physical storage areas belonging to the tiers based on an access record from the external apparatus, and
 classifies the unit physical storage areas into the tiers by comparing the calculated access frequencies with the access frequency threshold, and
 when a piece of the data is migrated between the tiers, the redundant data management part determines if the unit physical storage areas classified into the tiers by the tier controller include the redundant unit storage areas,
 when determining that the tier of a destination of the data migration includes the redundant storage areas, the redundant data management part changes a mapping of the unit logical storage area to the unit physical storage area as a source of the data migration to the mapping to the unit physical storage area as the destination, and,
 when the migration destination and the migration source are in the same tier, the redundant data management part changes the mapping of the unit logical storage area to the unit physical storage area that is any of the redundant unit storage areas to the mapping to another redundant unit storage area in the same tier.

2. The storage apparatus according to claim 1, wherein for the tier including any of the redundant unit storage areas, the tier controller performs, when determining that a total access frequency to the redundant unit storage areas exceeds the threshold of the access frequency, processing including: selecting any unit physical storage area from the redundant unit storage areas; and subtracting the access frequency of the selected redundant unit storage area from the total access frequency, the processing repeatedly performed until the total access frequency to the redundant unit storage area becomes equal to or smaller than the threshold, and the tier controller changes the mapping of the unit logical storage area to the unit physical storage area that is each redundant unit storage area targeted for the access frequency subtraction, when determining that the total access frequency to the redundant unit storage area decreases to the threshold or below.

3. The storage apparatus according to claim 1, wherein
 the redundant data management part determines if the unit physical storage areas includes areas storing same data, and,
 when determining that the unit physical storage areas include areas storing the same data, the redundant data management part determines which of the unit physical storage areas is selected to be left, and
 changes the mapping of the unit logical storage area to the unselected unit physical storage area storing the same data to the mapping to the unit physical storage area selected to be left.

4. The storage apparatus according to claim 1, wherein
 when detecting an instruction to store data into the unit logical storage area, the tier controller determines if the data is the same as data stored in the unit physical storage area associated with the unit logical storage area, and
 when determining that the data is not the same, the tier controller calculates an access frequency to the associated unit physical storage area on the assumption that there is no redundant unit storage area, and compares the calculated access frequency with an inter-tier migration access frequency threshold for migration between the tiers to determine which tier the unit physical storage area where to store the data is caused to belong to.

5. The storage apparatus according to claim 4, wherein the tier controller calculates an access frequency of the unit logical storage area targeted for the instruction to store data and compares the calculated access frequency with the inter-tier migration access frequency threshold to determine which tier the unit physical storage area where to store the data is caused to belong to.

6. The storage apparatus according to claim 1, wherein
the redundant data management part calculates the access frequency of each unit physical storage area on the assumption that there is no redundant unit storage area,
when determining that the calculated access frequency exceeds any of the inter-tier access frequency thresholds, the redundant data management part calculates an access frequency to the unit physical storage area on the assumption that a copy of the unit physical storage area having the redundant unit storage area in the corresponding tier is created, and compares the calculated access frequency with the access frequency threshold set for the tier, and
when determining that the access frequency is equal to or smaller than the access frequency threshold, the redundant data management part creates a copy in the tier.

7. The storage apparatus according to claim 6, wherein the redundant data management part performs redundant unit storage area copying processing by: calculating the access frequency of the unit physical storage area associated with each of the unit logical storage areas corresponding to the redundant unit storage areas, selecting one or more of the unit logical storage areas associated with the unit physical storage area so that the calculated access frequency with the access frequency of the unit logical storage area removed becomes equal to or smaller than the inter-tier migration access frequency threshold, and copying the unit physical storage area associated with the unit logical storage area in a tier to which the unit physical storage area belongs.

8. The storage apparatus according to claim 1, wherein
for the unit physical storage area having a migration destination tier determined,
the tier controller determines if a tier to which the unit physical storage area belongs is the same as the migration destination tier, and
when determining that the tiers are not the same as each other, the tier controller copies the unit physical storage area in the migration destination tier, changes the mapping of the unit logical storage area to the unit physical storage area to the mapping to the unit physical storage area copied in the migration destination tier, and manages a correspondence between the unit physical storage areas before the copying and the unit physical storage areas copied to the migration destination.

9. The storage apparatus according to claim 1, wherein
for the unit physical storage area having a migration destination tier determined, the tier controller determines if the redundant unit storage area is present, and
when determining that the redundant unit storage area is present, the tier controller determines if the unit physical storage area as the redundant unit storage area is present in the migration destination tier, and
when determining that the unit physical storage area is present, the tier controller associates the unit logical storage area currently associated with the unit physical storage area to be migrated to the determined migration destination tier with the unit physical storage area that is the redundant unit storage area in the migration destination tier, and deletes the mapping of the unit logical storage area to the unit physical storage area before migration to the migration destination tier.

10. The storage apparatus according to claim 1, wherein
the redundant data management part holds a capacity usage ratio threshold, for each tier, which is a threshold of an actual storage capacity usage ratio with respect to a usable maximum storage capacity, calculates the access frequency of each unit physical storage area on the assumption that there is no redundant unit storage area, and determines a migration destination tier of the unit physical storage area by comparing the calculated access frequency with an inter-tier migration access frequency threshold, and
when determining that a storage capacity used by the unit physical storage area in a migration destination tier exceeds the capacity usage ratio threshold for the tier, the redundant data management part creates a copy in the tier.

11. The storage apparatus according to claim 1, wherein
the storage apparatus is communicatively coupled to a different storage apparatus providing a logical storage area as a migration destination of the unit logical storage areas, the different storage apparatus including a configuration equivalent to the configuration of the storage apparatus, in the process of migrating data stored in the logical storage area to the logical storage area of the different storage apparatus, the tier controller sends the different storage apparatus information on mappings of the unit physical storage areas to the tiers and the unit logical storage areas in the storage apparatus, and information on the access frequencies, and acquires information on mappings of the unit physical storage areas to the tiers and the unit logical storage areas in the storage apparatus, and information on the access frequencies in the different storage apparatus, and
after the date stored in the logical storage area is migrated to the logical storage area of the different storage apparatus, the redundant data management part determines if the redundant unit storage area is present among the unit physical storage areas classified by the tier controller into the tiers of the different storage apparatus,
when determining that the redundant storage area is present in the tier of the different storage apparatus as a migration destination, the redundant data management part changes the mapping of the unit logical storage area to the unit physical storage area of the storage apparatus as the migration source to the mapping to the unit physical storage area of the different storage apparatus as the migration destination, and
when the migration destination and the migration source are in the same tier, the redundant data management part changes the mapping of the unit logical storage area to the unit physical storage area that is any of the redundant unit storage areas to the mapping to another redundant unit storage area in the same tier.

12. The storage apparatus according to claim 11, wherein when a recording format of information on mappings of the unit physical storage areas to the tiers and the unit logical storage areas in the storage apparatus and a recording format of information on mappings of the unit physical storage areas to the tiers and the unit logical storage areas in the different storage area are different from each other, the tier controller converts the recording format of the information in the storage apparatus to the recording format of the information in the different storage apparatus.

13. The storage apparatus according to claim 1, wherein a user setup screen information is outputted for setting a variety of thresholds for determining a method to control the unit physical storage area when any of the redundant unit storage area does not exist for the unit physical storage area.

14. The storage apparatus according to claim 1, wherein
when determining that the storage apparatus is set to be response performance-oriented, the tier controller controls inter-tier migration so that an access frequency in each tier assumed under control without having any redundant unit storage area does not exceed an inter-tier migration access frequency threshold for the tier, and
when determining that the storage apparatus is set to be throughput performance-oriented, the tier controller performs intra-tier copy control so that the access frequency in each tier assumed under control without having any redundant unit storage area does not exceed the inter-tier migration access frequency threshold.

15. A method of controlling a storage apparatus providing a logical storage area for storing data to an external apparatus, the storage apparatus including:
   a plurality of storage devices each providing a physical storage area for storing the data, the storage devices being different from each other in a device property including data input/output performance,
   a capacity virtualization part managing the physical storage areas of the storage devices as unit physical storage areas each having a predetermined storage capacity and managing the unit physical storage areas in association with a plurality of unit logical storage areas forming the logical storage area;
   a tier controller managing the plurality of unit physical storage areas by classifying the unit physical storage areas into a plurality of tiers the unit physical storage areas provided by the storage devices having the different device properties, and
   a redundant data management part managing redundant unit storage areas which are plurality of the unit physical storage areas storing the same data,
the method comprising:
classifying by the tier controller each of the unit physical storage areas into one of the tiers by use of a threshold of an access frequency from the external apparatus through the unit logical storage areas;
calculating by the tier controller, as the access frequency, an access frequency to each of the unit physical storage areas belonging to the tiers based on an access record from the external apparatus, and classifies the unit physical storage areas into the tiers by comparing the calculated access frequencies with the access frequency threshold; and
when a piece of the data is migrated between the tiers, determining by the redundant data management part if the unit physical storage areas classified into the tiers by the tier controller include the redundant unit storage areas,
when determining that the tier of a destination of the data migration includes the redundant storage areas, the redundant data management part changes a mapping of the unit logical storage area to the unit physical storage area as a source of the data migration to the mapping to the unit physical storage area as the destination, and,
when the migration destination and the migration source are in the same tier, changing by the redundant data management part the mapping of the unit logical storage area to the unit physical storage area that is any of the redundant unit storage areas to the mapping to another redundant unit storage area in the same tier.

* * * * *